US012798175B2

(12) United States Patent
Choi

(10) Patent No.: US 12,798,175 B2
(45) Date of Patent: Nov. 17, 2026

(54) METHOD OF EXTRUDING AND CONTROLLING COOLING RATE TO AVOID THERMAL WELDING OF SHEATH AND DUCT AT HIGHER SPEED

(71) Applicant: Dura-Line LLC, Knoxville, TN (US)

(72) Inventor: Moonpil Choi, Knoxville, TN (US)

(73) Assignee: DURA-LINE LLC, Knoxville, TN (US)

( * ) Notice: Subject to any disclaimer, the term of this patent is extended or adjusted under 35 U.S.C. 154(b) by 372 days.

(21) Appl. No.: 18/516,169

(22) Filed: Nov. 21, 2023

(65) Prior Publication Data

US 2025/0162231 A1 May 22, 2025

(51) Int. Cl.

*B29C 63/18* (2006.01)
*B29C 48/09* (2019.01)
*B29C 48/11* (2019.01)
*B29C 48/88* (2019.01)
*G02B 6/44* (2006.01)
*B29L 11/00* (2006.01)
*B29L 23/00* (2006.01)

(52) U.S. Cl.

CPC .............. *B29C 63/18* (2013.01); *B29C 48/09* (2019.02); *B29C 48/11* (2019.02); *B29C 48/911* (2019.02); *B29C 48/9115* (2019.02); *B29C 48/919* (2019.02); *G02B 6/4459* (2013.01); *B29K 2023/06* (2013.01); *B29L 2011/0075* (2013.01); *B29L 2023/00* (2013.01)

(58) Field of Classification Search

CPC ... B29C 48/912; B29C 48/919; B29C 48/911; B29C 48/11

See application file for complete search history.

(56) References Cited

U.S. PATENT DOCUMENTS

| | | | | |
|---|---|---|---|---|
| 5,766,540 A * | 6/1998 | Kajiwara | A22C 13/0013 | 425/467 |
| 6,444,161 B1 * | 9/2002 | Williams | B29C 48/902 | 264/102 |
| 6,485,282 B2 * | 11/2002 | Wegmaier | B29C 48/911 | 425/72.1 |
| 6,645,410 B2 * | 11/2003 | Thompson | B29C 48/10 | 425/114 |
| 6,676,881 B1 * | 1/2004 | Byun | H02G 3/0462 | 264/516 |
| 6,821,591 B2 * | 11/2004 | Gord | B29C 48/08 | 264/209.3 |
| 6,905,646 B1 * | 6/2005 | Oka | B29C 48/904 | 264/211.13 |

(Continued)

FOREIGN PATENT DOCUMENTS

CN 110850539 A 2/2020

OTHER PUBLICATIONS

Extended European Search Report dated Jan. 24, 2025 from European Patent Application No. EP 24 19 5491.

*Primary Examiner* — Benjamin A Schiffman

(74) *Attorney, Agent, or Firm* — Greer, Burns & Crain, Ltd.

(57) ABSTRACT

An apparatus for making a product comprising a plurality of microducts bundled within a protective outer sheath, wherein the apparatus functions to inhibit thermal welding of the sheath and the microducts, and a corresponding method of making the bundled microducts.

8 Claims, 26 Drawing Sheets
(26 of 26 Drawing Sheet(s) Filed in Color)

(56) References Cited

U.S. PATENT DOCUMENTS

| | | | | |
|---|---|---|---|---|
| 7,029,622 | B2 * | 4/2006 | Zikeli | B29D 7/01<br>264/210.8 |
| 7,488,339 | B2 * | 2/2009 | St. Pierre | B29C 48/10<br>604/103 |
| 8,702,410 | B2 * | 4/2014 | Hackl | B29C 48/86<br>425/467 |
| 10,076,634 | B2 * | 9/2018 | Dando | B29C 48/92 |
| 11,040,170 | B2 * | 6/2021 | Ganatra | A61L 31/148 |
| 2017/0144938 | A1 * | 5/2017 | Li | B01J 35/647 |
| 2024/0217156 | A1 * | 7/2024 | Lukubira | B29C 48/09 |

* cited by examiner

| Water | Speed | Air Gap | 1 | 2 | 3 | 4 | 5 | 6 | Note |
|---|---|---|---|---|---|---|---|---|---|
| Chilled | Slow | Short | 0.065 | 0.068 | 0.065 | 0.071 | 0.061 | 0.063 | Standard per PRP |
| Chilled | Fast | Long | 0.067 | 0.068 | 0.065 | 0.073 | 0.061 | 0.062 | Almost tear |
| Chilled | Fast | Short | 0.065 | 0.068 | 0.064 | 0.072 | 0.064 | 0.064 | Intentional sticking |
| Hot | Slow | Short | 0.068 | 0.068 | 0.069 | 0.073 | 0.064 | 0.060 | |
| Hot | Fast | Short | 0.068 | 0.069 | 0.073 | 0.063 | 0.062 | 0.071 | |
| Hot | Fast | Long | | | Sheath Tear | | | | |
| Empty | Slow | Long | | | Sheath Tear | | | | |
| Empty | Fast | Short | 0.058 | 0.067 | 0.058 | 0.056 | 0.066 | 0.061 | Best result at fast speed |
| Empty+Air | Slow | Long | | | Sheath Tear | | | | |
| Empty+Air | Fast | Short | 0.061 | 0.071 | 0.062 | 0.060 | 0.071 | 0.063 | |

Leg Condition
- Slide out
- Sticky
- Welded

Duct numbering
*Facing towards die – standard sequence not used in experiment

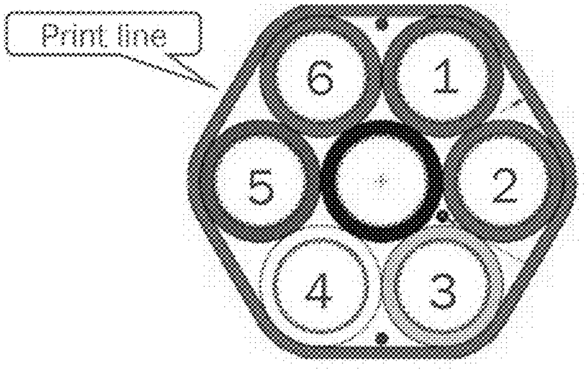

Fig. 7

Leg Condition
- Slide out
- Sticky
- Welded
Results – Sheath thickness above duct
| 1 | 2 | 3 | 4 | 5 | 6 |
|---|---|---|---|---|---|
| 0.047 | 0.053 | 0.040 | 0.046 | 0.056 | 0.047 |
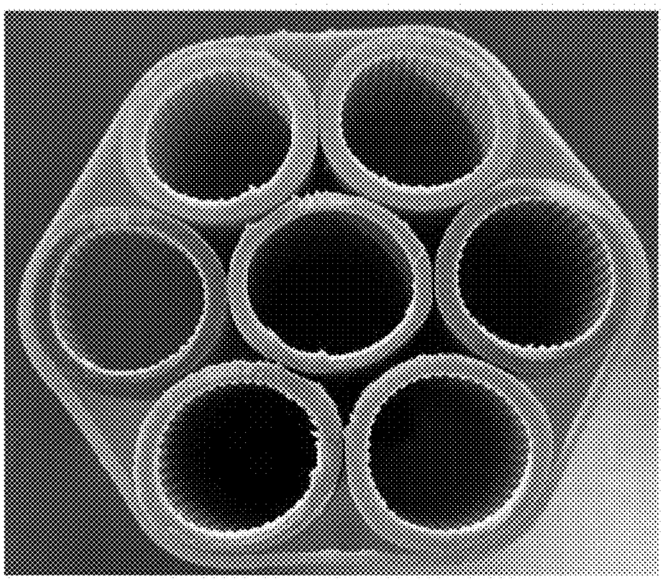
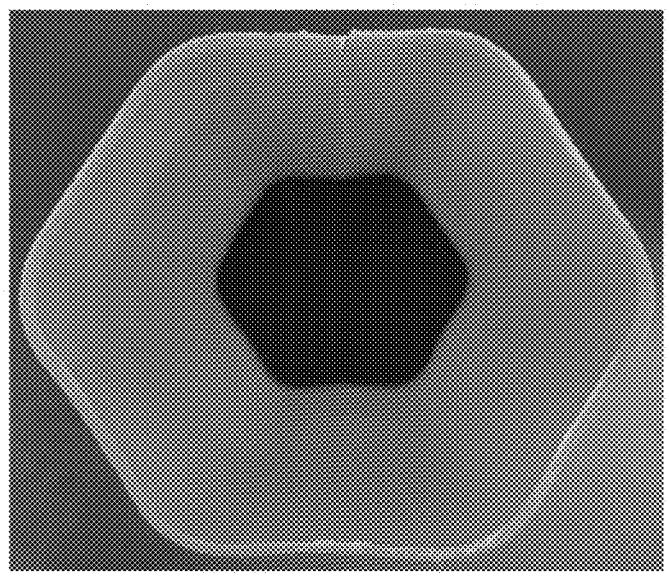
Fig. 14

| Water | Speed | Air Gap | MDT Avg | TDT Avg | MDT:TDT | Width | Height | W:H | SF |
|---|---|---|---|---|---|---|---|---|---|
| Hot | Slow | Short | 68% | 124% | 0.55 | -45% | -12% | 3.71 | 0.00 |
| Hot | Fast | Short | 117% | 169% | 0.69 | -41% | -12% | 3.54 | 0.50 |
| Chilled | Fast | Short | 82% | 163% | 0.50 | -51% | -8% | 6.65 | 5.00 |
| Chilled | Fast | Long | 83% | 97% | 0.85 | -65% | 7% | 9.63 | 0.50 |
| Chilled | Slow | Short & Thin | 155% | 175% | 0.88 | -52% | -4% | 14.24 | 0.00 |
| Empty | Fast | Short | 88% | 99% | 0.88 | -48% | -1% | 48.51 | 0.00 |
| Empty + Air | Fast | Short | 42% | 90% | 0.46 | -33% | -18% | 1.85 | 2.00 |
| Daisy | Duct | Short | 138% | 128% | 1.08 | -59% | 11% | 5.56 | 0.00 |
| | | Average | 96% | 131% | 0.74 | -49% | -5% | 10.66 | |

- MDT – Machine Direction Thickness / TDT – Transverse Direction Thickness
- SF – Sticky factor (condition of the ducts based on the scores below)
  - 0 – slide out / 0.5 – sticky / 1.0 - welded

Fig. 16

| Water | Speed | Air Gap | 1 | 2 | 3 | 4 | Note |
|---|---|---|---|---|---|---|---|
| Chilled | Slow | Long | 0.077 | 0.069 | 0.065 | 0.056 | Standard per PRP |
| Chilled | Fast | Long | 0.077 | 0.071 | 0.068 | 0.057 | Intentional sticking |
| 3' Empty | Fast | Long | 0.079 | 0.071 | 0.073 | 0.061 | Better, but still welded |
| 9' Empty | Fast | Long | 0.078 | 0.074 | 0.071 | 0.060 | Best result at fast speed |
| Spray | Fast | Long | 0.080 | 0.076 | 0.074 | 0.060 | Worst result at fast speed |

Leg Condition
- Slide out
- Sticky
- Welded

Duct numbering (facing toward die)

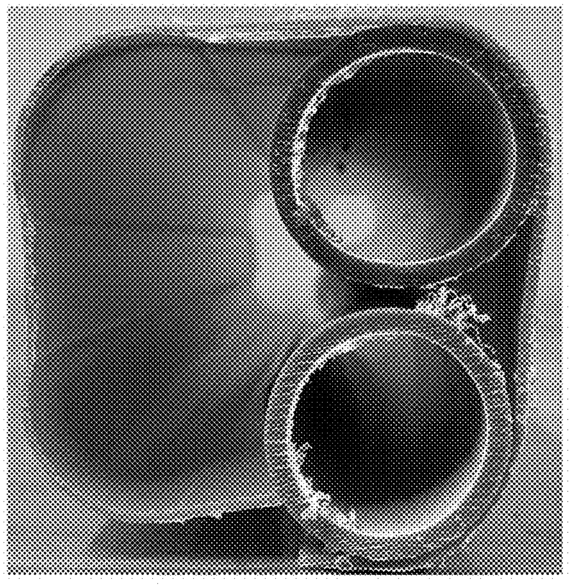
Chilled/Fast/Long
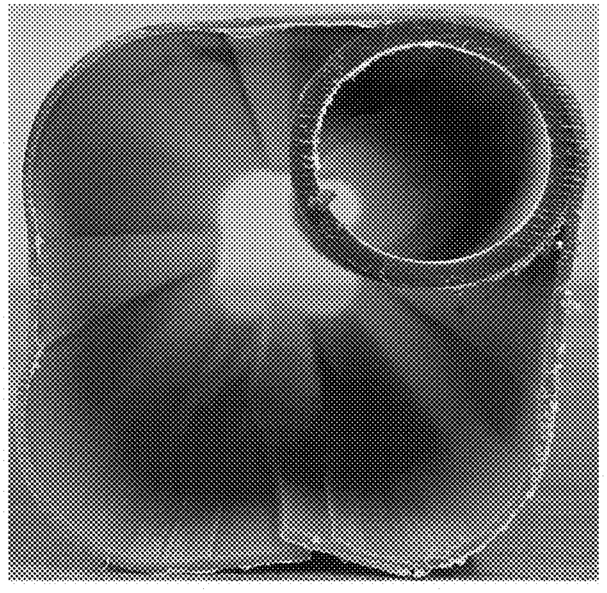
Empty/Fast/Long
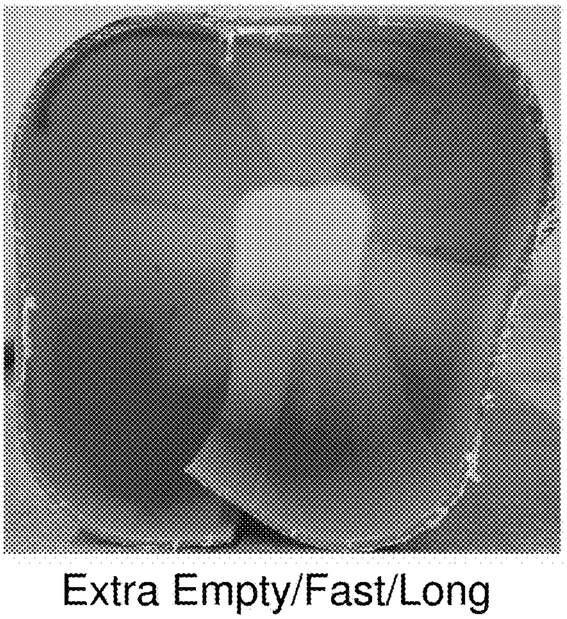
Extra Empty/Fast/Long
Fig. 20

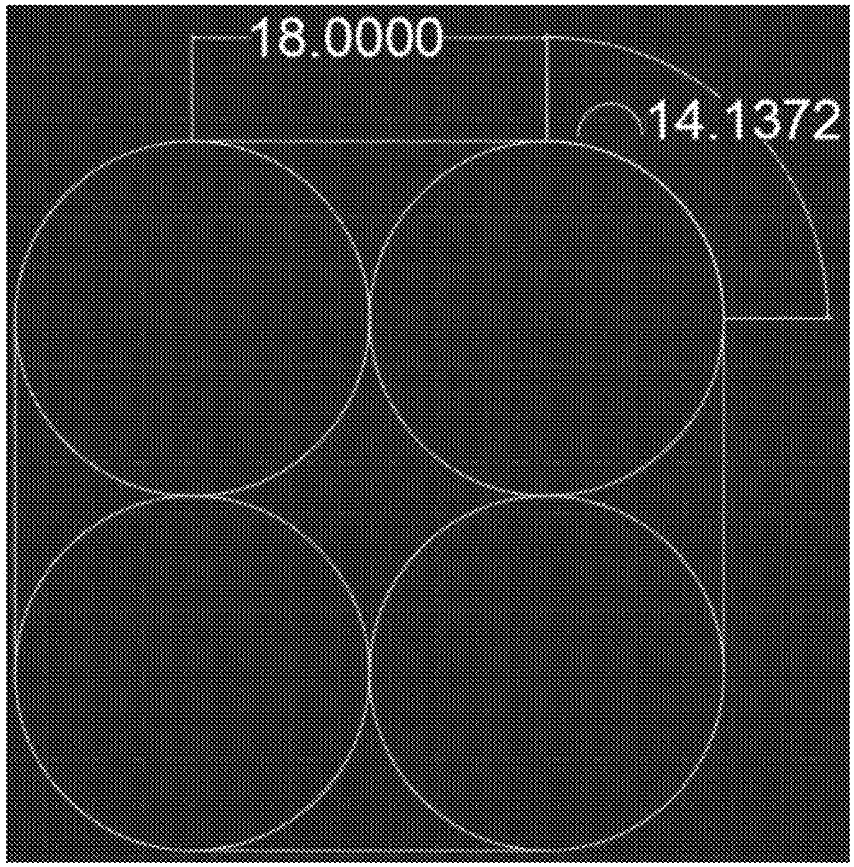
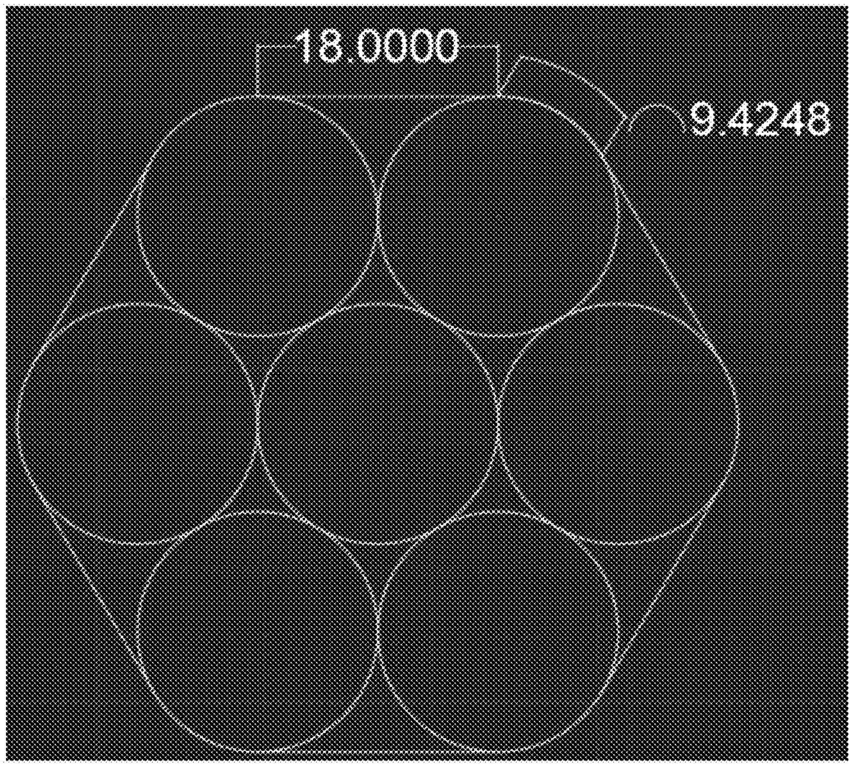
Fig. 23

METHOD OF EXTRUDING AND CONTROLLING COOLING RATE TO AVOID THERMAL WELDING OF SHEATH AND DUCT AT HIGHER SPEED

BACKGROUND

Microducts are small ducts or conduits used to install fiber optic cables. They typically range in size from about 3 mm to about 16 mm and are encased as bundles within a larger duct, sheath, or oversheath. Microducts are thus small-diameter, flexible, or semi-flexible ducts designed to provide a protective, clean, continuous, and low-friction path for optical cables. The low-friction nature of microducts is required because fiber optic cable itself has a relatively low pulling tension limit. As a general proposition, microducts should be compatible with existing construction designs and building configurations for both riser-rated and plenum-rated applications, including cable blowing apparatus. Microducts should also allow fiber optic cable to be successfully deployed through pull lines or strings using less than about 50 ft-lbs of force and via cable-blowing techniques at deployment speeds of roughly 100 to 200 feet per minute.

Microducts were developed as a solution to house fiber optic "microcables" that are much smaller in diameter that traditional fiber optic cable, but still carry significant signal capacity. For example, a traditional 144-fiber loose-tube cable is roughly 15 to 16 mm in diameter. In contrast, a comparable 144-fiber microcable is only about 8 mm in diameter and about one-third the weight of the conventional cable. The smaller size and weight allow for larger fiber counts. Thus, a host of microducts housed within one outer sheath provides multiple ducts in one structure. This allows for far easier installation of networks that include space for future expansion.

Microducts are not without their unique issues, however. One recurring issue, which arises during the manufacturing of the bundled microducts within the outer sheath, is the unintentional and unwanted welding of the sheath to the ducts inside. The outer sheath is supposed to protect the microducts bundled inside the sheath, while still allowing an access aperture to be cut into the sheath (for example, to install a connector). But when the inner surface of the sheath is accidentally welded to the outer surface of one or more microducts, it become difficult or impossible to access one or more specific microducts within the larger bundle of microducts inside the sheath.

SUMMARY

Conventionally, during the sheathing of the microducts, the heated oversheath material is cooled by water in a series of cooling tanks. Upon experimentation, the present inventors have found that the cause of the unwanted welding is from shrinkage of the sheath polymer material due to unbalanced cooling of the inside surface versus outside surface of the sheathing material. This results in the sheath having a frozen (or suitably stiff) outer surface, but a still-molten (or too soft) inner surface. The molten/soft plastic of the inner surface of the sheath has nowhere to travel but toward the center of the bundle as the sheath cools and shrinks from its outside surface inward. The still-molten inner surface of the sheath then oozes between the microducts and solidifies, The result is unwanted (and permanent) welding of the sheath to the microducts.

It has been discovered that the onset of welding can be visually detected by ridges which form on the inner surface of the sheath. Additionally, the present inventors have determined that the higher the temperature difference between the bulk sheath material and the cooling process water, the more severe the sheath will shrink, resulting in welding.

There are several options to lower the temperature difference between the sheathing material and the cooling water, but the obvious options cause reduced production rates or other quality issues. So, for example, one could simply increase the temperature of the cooling water. But doing so unacceptably slows the production rate because it takes longer for the extruded sheath material to cool and harden around the encased microducts.

Disclosed herein are apparatus and methods for making a product comprising a plurality of microducts bundled with a sheath. The apparatus and methods are designed to inhibit thermal welding of sheath and ducts while simultaneously allowing for high production speed. The apparatus comprises: (a) a die for extruding a molten thermoplastic material (e.g., polyethylene) to form the sheath; (b) an air gap between the die and a cooling tank; and (c) a cooling tank optionally divided into two or more sections. When the cooling tank is divided, a first section of the cooling tank contains only air at a temperature lower than the temperature of the air gap, and the remaining section(s) of the cooling tank contain a cooling liquid (preferably water) and pre-selected temperatures.

Compared to conventional practices that minimize or eliminate any air gap and fill the entire cooling tank with water to cool the sheath, the extended air exposure of the present disclosure (including the air gap and at least the first section of the cooling tank) allows the sheath to be air cooled for an extended time period. Because air is a poorer conductor compared to water, the extended air exposure reduces the cooling rate of the sheath. The reduced cooling rate results in a slower shrinkage rate of the sheath. This provides additional time for the inner surface of the sheath to harden before the shrinkage of the sheath brings its inner surface into contact with the outer surface of the encased microducts. In this fashion, the inner surface of the sheath is sufficiently hard to inhibit and/or to prevent entirely any welding of the sheath to the microducts. The process thus lowers the sheath temperature before it enters the cooling tank. This yields a smaller temperature difference ($\Delta T$) between the sheath and the cooling medium in the cooling tank. In turn, the decreased $\Delta T$ yields less shrinkage of the sheath and less welding.

To provide sufficient time for air cooling, the air gap and the first section of the cooling tank are preferably dimensioned and configured to have a total length of at least about 0.5 meters. In one specific version of the apparatus, the air gap and the first section of the cooling tank have a total length of between about 0.5 meter and about 2 meters. Longer and short air gaps, however, are explicitly within the scope of the method. The preferred air gap distance is as long as possible without incurring sag in the sheath material. Thus, determining the ideal air gap for any given situation is empirical based on the material from which the sheath is made, the temperature at which it exits the die, the thickness and diameter of the sheath, etc. The cooling tank may comprise an adjustable divider for adjusting the length of the various sections of the tank. With the extended period of air cooling, the sheath can be extruded at an increased rate, while still inhibiting welding between the sheath and the microducts. Thus, the apparatus and method disclosed herein can attain a production speed at least 10%, or at least 25%, or at least 50% higher than conventional manufacturing (wherein there is no air gap and the cooling tank has only one section filled with cooling liquid).

In one exemplary version, the apparatus is used to make a product comprising at least seven microducts, wherein the air gap has a length of about 20 cm (~8 inches), and the first section of the cooling tank has a length of about 60 cm (~24 inches). Using this apparatus, the production speed was increased by about 70% compared to the conventional practice, without any welding in the resulting product.

In another exemplary version, the apparatus is used to make a product comprising at least four microducts, wherein the air gap has a length of about 28 cm (~11 inches) and the first section of the cooling tank has a length of about 2.7 meters (~9 feet). Using this apparatus, the production speed was increased by about 60% compared to the conventional practice, without any welding in the resulting product. In this example, the microduct comprised four (4) 1.25 inch (31.8 mm) conduits.

The objects and advantages of the disclosure will appear more fully from the following detailed description of the preferred embodiment of the disclosure made in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 7 is a table showing test results of the process for making the 7-way microduct bundle using the apparatus depicted in FIG. 6 under various water temperature/speed/air gap conditions. Sheath thickness above each of the outer six ducts was measured and is shown in the table. The lower left panel shows the color coding of the six outer microducts (i.e., "legs"; those microducts in direct contact with the sheath). Three conditions were recorded: Green="slide out," i.e., the microducts could be slid out (axially) from the sheath, with ease. Orange="sticky," i.e., the microducts could be slid out (axially) from the sheath, but only with considerable force. Red="welded," i.e., the microducts were welded to the sheath and could not be slid out. The lower right panel shows duct numbering and color coding for the six microducts in direct contact with the sheath.

FIG. 14 shows conditions of the seven (7) microducts bundled with a thinner sheath than the sheath shown in FIGS. 8-13. This bundle was produced under the water temperature/speed/air gap condition of chilled/slow/short. The top panel shows all seven microducts immediately after cutting into the sheath. The bottom panel shows the sheath alone after removal of the microducts.

FIG. 16 shows machine direction thickness (MDT), transverse direction thickness (TDT), and sticky factor (SF) of sheath produced under various water temperature/speed/air gap conditions.

FIG. 20 shows conditions of the 4-way microducts bundled with a sheath produced under the water temperature/speed/air gap conditions of chilled/fast/long (upper left; two microducts welded to sheath), empty/fast/long (upper right; one microduct welded to sheath), and extra empty/fast/long (lower left; no welding).

FIG. 23 shows surface area contact between sheath and ducts for the 4-way microduct bundles (upper) and the 7-way microduct bundles (lower). Each microconduit is 18 mm in diameter.

DETAILED DESCRIPTION

Figure 1:
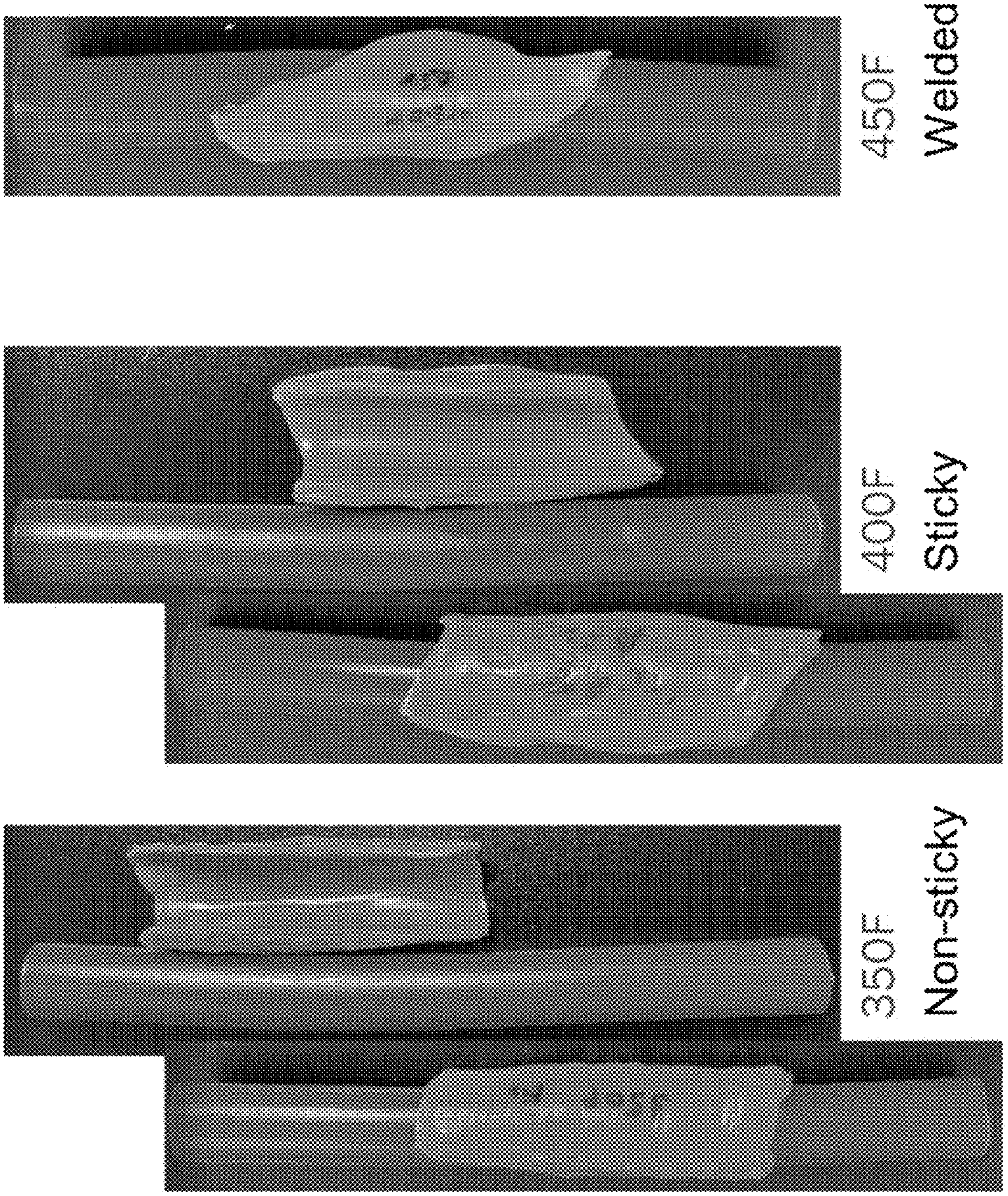
FIG. 1 compares conditions of the sheath material (orange) at 350° F., 400° F., and 450° F., at a pressure of firm handpress and with air cooling. The sheath at 350° F. (left) was not sticky; the sheath at 400° F. (middle) was sticky; and the sheath at 450° F. (right) was welded to the microduct (blue).

Provided herein is a method of preventing thermal welding of sheath and ducts in the making microduct bundles by carefully controlling the cooling rate of the sheath as it is disposed about the microducts. A key and unintuitive technique is to delay the cooling process by having the extruded sheath air cooled for an extended time period. Air being a generally poor cooling medium, the heat from the sheath surface is shed more slowly and steadily and shrinkage of the sheath then occurs more evenly. Once the temperature of the outer surface of the sheath falls below about 390° F. (about 199° C.), cooling the sheath with chilled water does not cause welding, regardless of throughput, sheath thickness, outer diameter, or machine type. For reference, the surface temperature of the sheath material (typically HDPE) was about 450° F. (232° C.) immediately upon exiting the extrusion die. (This exemplary temperature, however, is machine-specific. For example, extruding the same material in a larger extruder will lower the melt temperature due to the lower RPM of the screw and corresponding decreased shear rate. Conventionally, the sheath was provided to 6 inches (15.2 cm) of air exposure. In one version of the process, the method sues about a 900% increase of air exposure to lower the sheath surface temperature to the desired target. Contrary to conventional practice and thinking, increasing air cooling to 5 feet (1.75 meters) yields a dramatic increase in production rate without causing welding.

Conventional processes of bundling microducts with an oversheath comprise extruding molten material (e.g., polyethylene) from a die to shape the material into a roughly cylindrical form that covers the microducts. Conventionally, the sheath extrudate exiting the die is exposed to air (i.e., a short air gap) before entering a series of cooling tanks to be cooled with water to reduce the temperature of the product. The temperature difference between the sheath and water results in unbalanced cooling of the outside and inside surfaces of the sheath, such that the outer surface of sheath is stiffened, but the inner surface of the sheath remains molten. The molten plastic has nowhere to travel but toward the center, flowing between the ducts as it cools and hardens. When the inner surface of the sheath and the outer surface of the microducts come into thermal equilibrium, the sheath becomes permanently welded to the microducts. This is a highly unfavorable and unwanted outcome.

Thus, disclosed herein is a method to prevent thermal welding of sheath and duct by controlling the cooling rate of the sheath material. This is achieved by extending the length of the air gap, and/or by emptying a first section of a cooling tank for extended air exposure. The system may comprise an adjustable divider in the cooling tank to optimize the length of air exposure. To provide sufficient time for air cooling, the total length of the air gap and the first section of the cooling tank is at least about 2 feet, and in some embodiments, at least about 3, 4, 5, 6, 7, 8, 9, or 10 feet (i.e., about 0.6 meters to about 3.05 meters).

With the extended length of air exposure, the system allows for higher production speed without welding compared to the conventional practices. In some embodiments, the production speed is increased by at least 10%, 20%, 30%, 40%, 50%, 60%, 70%, 80%, 90%, or 100% compared to the conventional practices.

The forgoing detailed description of the disclosure is to aid those skilled in the art in practicing the present method. Those of ordinary skill in the art may make modifications and variations in the embodiments described herein without departing from the spirit or scope of the present disclosure.

Although any methods and materials similar or equivalent to those described herein can also be used in the practice or testing of the present disclosure, the preferred methods and materials are now described. While the disclosure will be described in conjunction with the exemplary versions, it will be understood that it is not intended to limit the disclosure to those versions. To the contrary, it is intended to cover alternatives, modifications, and equivalents as may be included within the spirit and scope of the disclosure as defined by the appended claims.

Unless defined otherwise, all technical and scientific terms used herein have the same meaning as commonly understood by one of ordinary skill in the art to which embodiments of the disclosure pertain. Many methods and materials similar, modified, or equivalent to those described herein can be used in the practice of the embodiments of the present disclosure without undue experimentation.

As used herein, the singular forms "a," "an," and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

As used herein, the term "about" refers to ±10% of the variable referenced.

As used herein, the term "or" is an inclusive "or" operator and is equivalent to the term "and/or" unless the context clearly dictates otherwise. Unless otherwise clear from context, all numerical values provided herein can be modified by the term "about."

The elements and method steps described herein can be used in any combination whether explicitly described or not, unless otherwise specified or clearly implied to the contrary by the context in which the referenced combination is made.

All combinations of method steps as used herein can be performed in any order, unless otherwise specified or clearly implied to the contrary by the context in which the referenced combination is made.

The system disclosed herein may comprise, consist of, or consist essentially of the various steps and elements disclosed herein. The disclosure provided herein may be practiced in the absence of any element or step which is not specifically disclosed herein.

EXAMPLES

Example 1: Identify Contributors to Welding

The sheath of microduct bundles is prone to permanently adhering to (i.e., welding to) to the microducts (also called "legs") in the following situations: (1) relatively thick sheath; (2) high production speed; and (3) high temperature of sheath up exit from extruder. Lab-scale mock tests were performed for root cause analysis (RCA) via replicating the problem. The goal was to identify the biggest contributor(s) to welding/sticking by varying the process conditions and improving the process conditions based on the findings. Test specimens were convention: sheath thicknesses of 0.07" (1.78 mm) and 0.2" (5.1 mm) (nominal) and 12/7 microduct (i.e., 12 mm O.D./7 mm I.D. nominal thickness).

Effects of sheath temperature on sticking were tested at 350° F. (177° C.), 400° F. (204° C.), and 450° F. (232° C.) with pressure of a firm handpress and air cooling. Higher temperatures cause thermal welding. See FIG. 1. The 0.2" sheath is sticky at typical melt temperatures out of the die (400° F.) without cooling.

Figure 2:
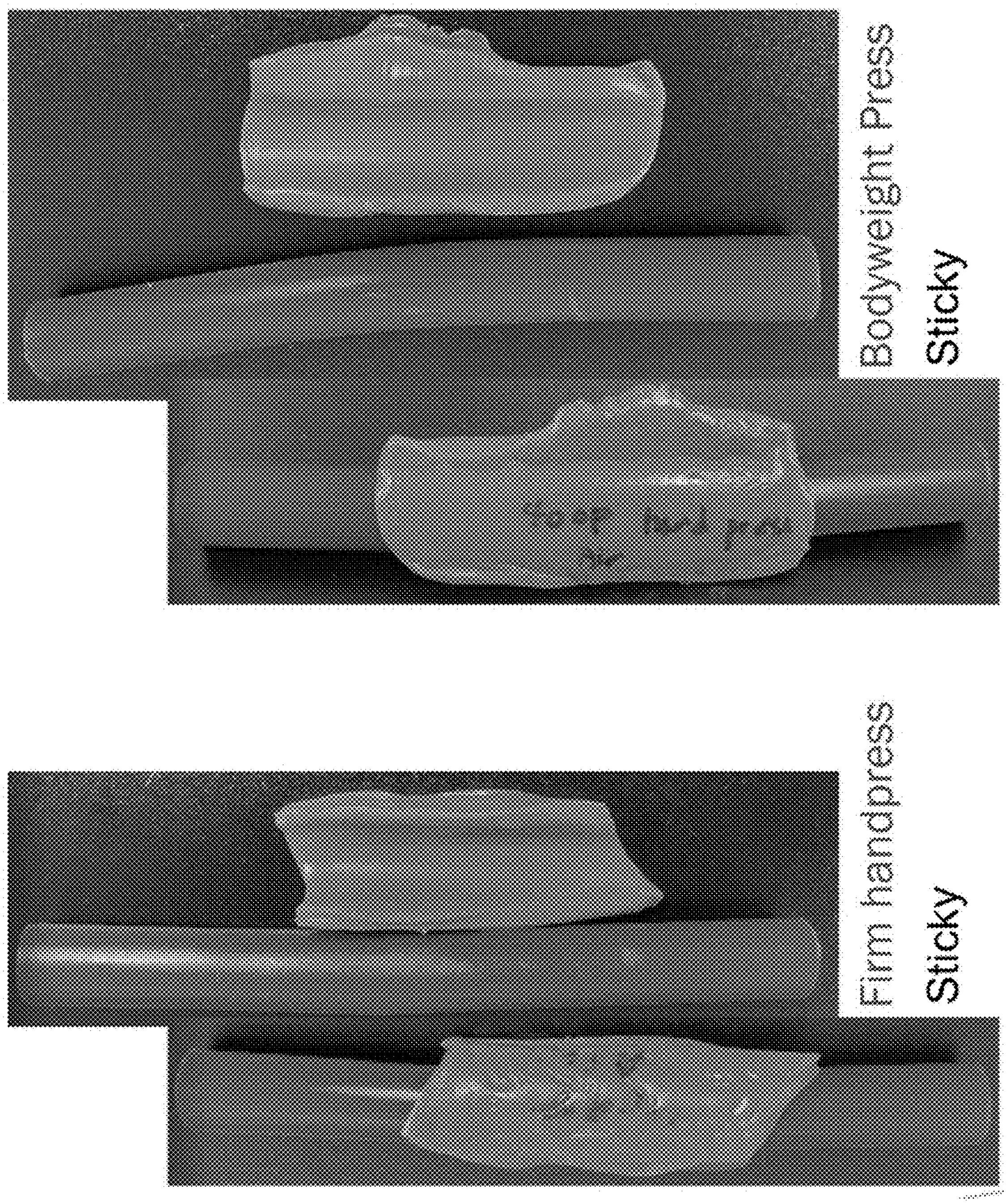
FIG. 2 compares conditions of the sheath (orange) at pressures of firm handpress (left) and bodyweight press (right). The sheath is at a temperature of 400° F. and with air cooling. The sheath was sticky under both conditions.

Effects of pressure on sticking were tested at pressures of a firm handpress and bodyweight press at 400° F. and with air cooling. The sheath is sticky under both conditions (FIG. 2), indicating that pressure does not have a significant effect on welding.

Figure 3:
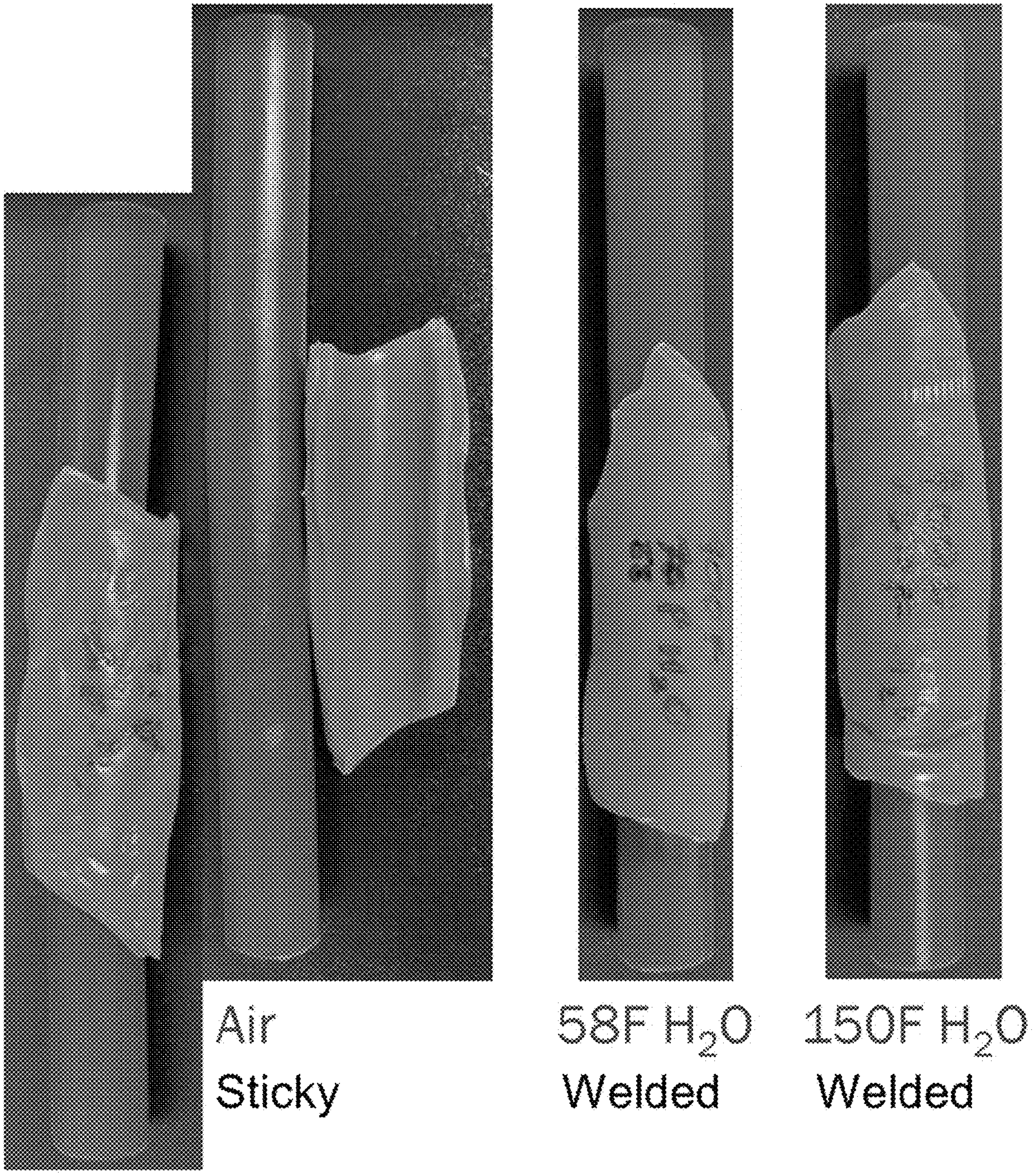
FIG. 3 compares conditions of the sheath (orange) under various cooling temperatures. The sheath cooled with air (left) was sticky. The sheaths cooled with 58° F. $H_2O$ (middle) or 150° F. $H_2O$ (right) were welded to the microducts (blue).

Effects of cooling temperature on welding were tested using ambient air cooling (about 72° F./22° C.), 58° F. $H_2O$, and 150° F. $H_2O$ with the initial sheath temperature of 400° F. and pressure of a firm handpress. The sheath was welded at a typical chilled-water temperature of 58° F./14.4° C. with 0.2" sheath thickness (FIG. 3). In contrast, 0.07" sheath material does not cause welding under these same conditions. This result demonstrates that the thickness of the sheath material is a causative factor for welding.

Sudden, large temperature differences between the molten sheath material and the cooling medium also cause rapid shrinkage, causing sheath to "grip" the ducts as it cools, again leading to welding. Microbubbles were formed in the sheath material when the cooling water was set at 150° F. (65.5° C.).

Figure 4:
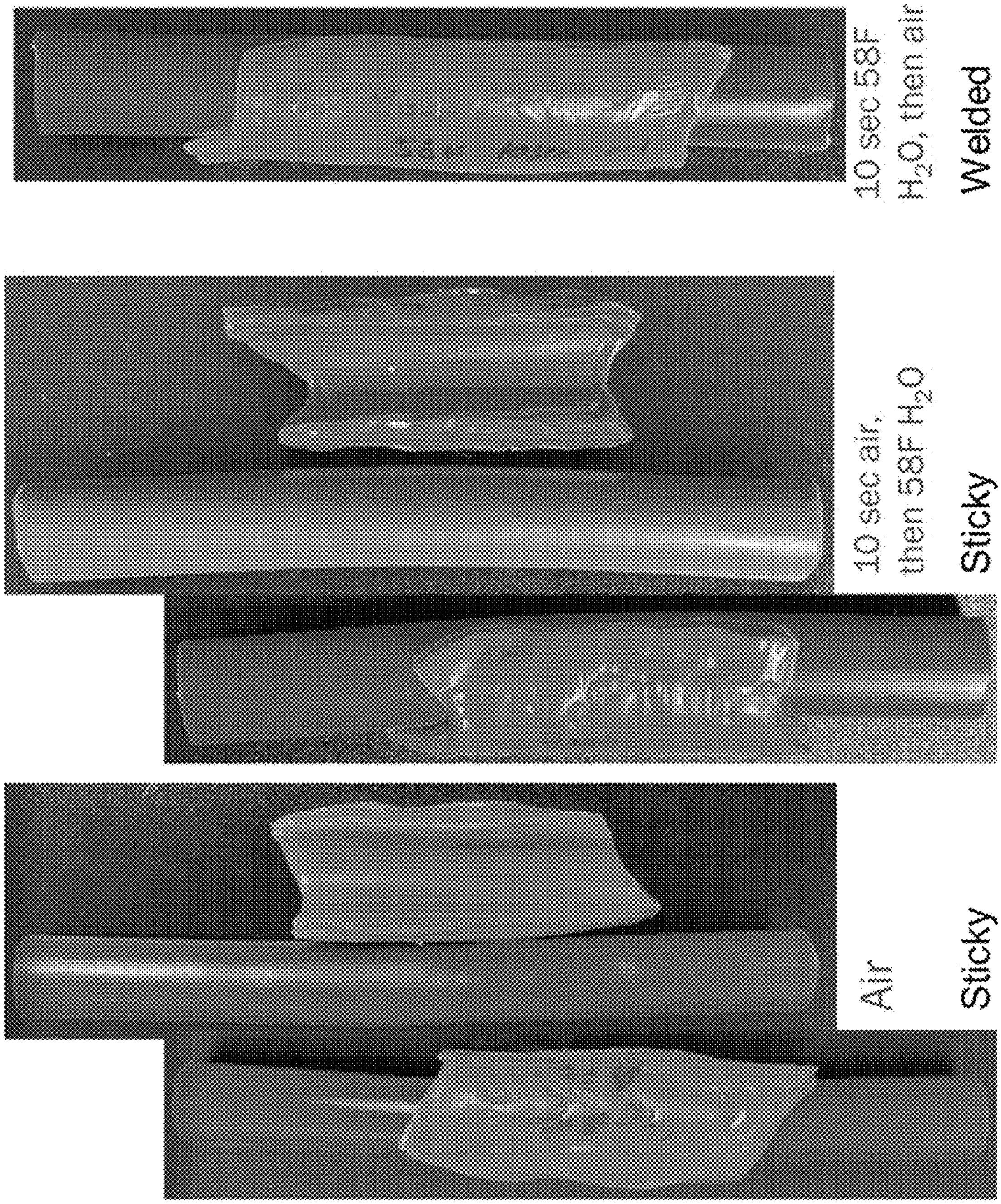
FIG. 4 compares conditions of the sheath (orange) under various cooling times. The sheaths cooled by 10 seconds of air alone (left) or 10 seconds of air followed by 58° F. $H_2O$ (middle) were sticky, while the sheath cooled for 10 seconds with 58° F. $H_2O$ followed by air (right) was welded with the microduct (blue).

Effects of cooling time on sticking were tested for ambient air cooling alone, 10 seconds ambient air followed by 58° F. $H_2O$, and 10 seconds 58° F. $H_2O$ followed by ambient air with the initial sheath temperature of 400° F. and pressure of a firm handpress. The longer the air cooling was, the less sheath became sticky and the less it welded to the microducts (FIG. 4). Thus, air cooling ties into temperature differences and shrinkage rates as causative factors in welding.

Figure 5:
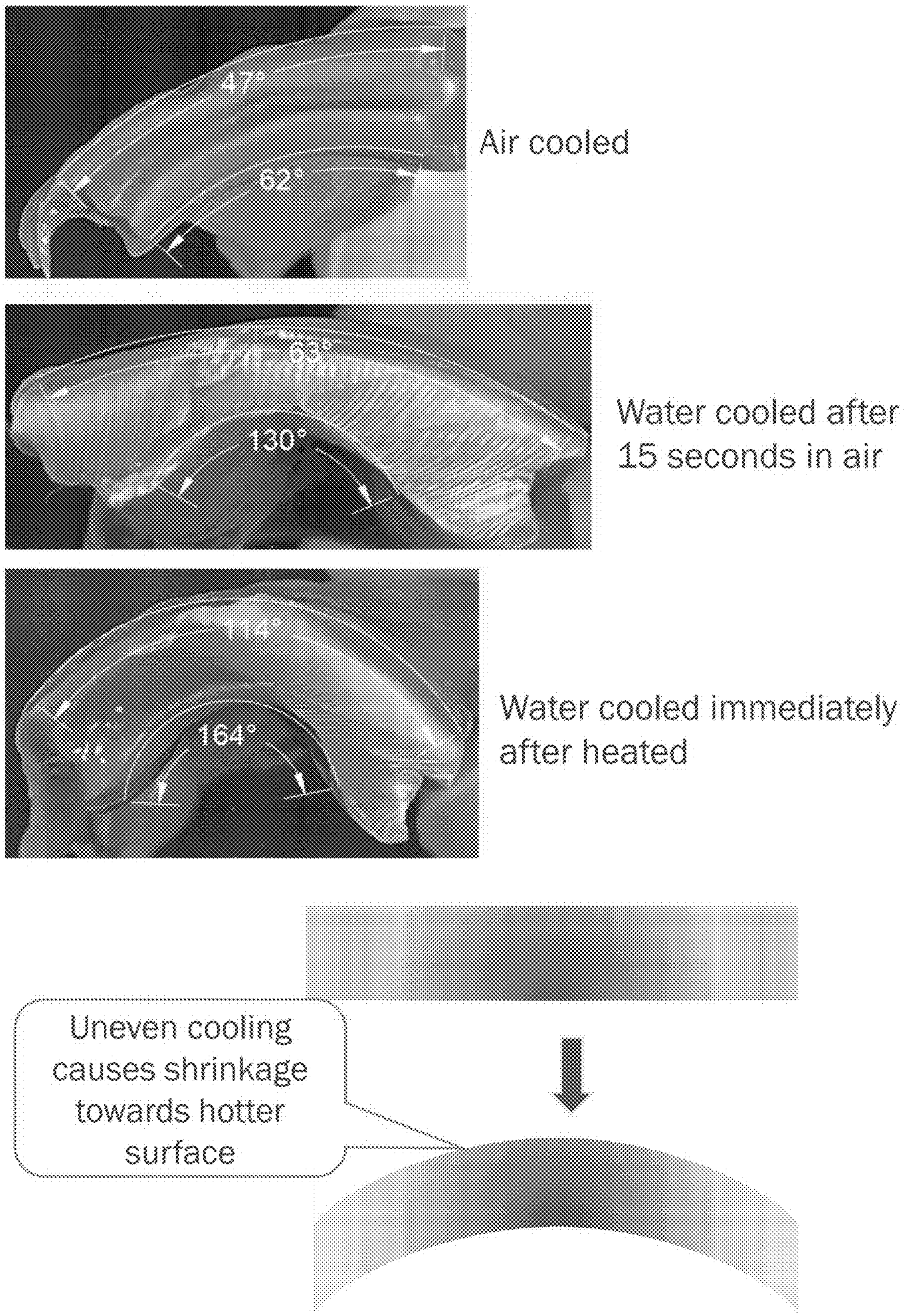
FIG. 5 shows shrinkage of sheath cooled by 15 seconds in air (top), cooled by 15 seconds in air followed by water (second from top), and cooled by immediately after heating (third from top). The bottom panel is a schematic diagram showing that uneven cooling causes shrinkage toward hotter surface.

Sheath shrinkage was also compared between ambient air cooling alone, water cooling after 15 seconds in air, and water cooling immediately after the sheath exited the extruder. Samples were heated to 400° F., and then placed in/on the 58° F. water (free-floating) until cool to the touch. See FIG. 5. As shown in FIG. 5, uneven cooling causes shrinkage toward the hotter (inner) surface of the sheath. Air cooling had the least amount of shrinkage (top panel of FIG. 5; 47° of shrinkage on the outer surface versus 62° on the inner surface), compared to water cooling immediately after heating (third panel from top in FIG. 5; 114° shrinkage on the outer surface versus 164° shrinkage on the inner surface.). Because air cooling is much slower than water cooling, the shrinkage amount can be decreased by decreasing the rate of cooling. At the same time, the air cooling decreases the ΔT between the sheath and the cooling medium, which likewise decreases shrinkage of the sheath (which decreases the incidence of welding).

The above tests show that sheath temperature and shrinkage are the biggest contributors to welding. A thinner sheath experiences a faster rate of cooling via natural convection in air. When the line speed is increased, the sheath has less time in air. This explains, in part, the welding issue. Because air is poor heat conductor compared to water, the sheath warps more in cooling water even when the water is at the same temperature as the air and the exposure times are the same. Welding thus occurs in the first moments after the sheath material exits the die—when its inner surface is still molten, but cooling and shrinking far more than the outer, already-stiffened surface. Thus, to minimize warping of the inner surface of the sheath (and thus to minimize welding), the cooling rate must be controlled and exposure to air needs to be extended (via a longer air gap or slower machine speed). The goal is to achieve more even cooling of the inner and outer surfaces of the sheath.

Based on the initial tests, production trials were conducted to confirm the findings and look for additional process improvements that decrease welding while maintaining (or increasing) production speed.

Example 2: Production Trial of 7-Way Microduct Bundles

Figure 6:
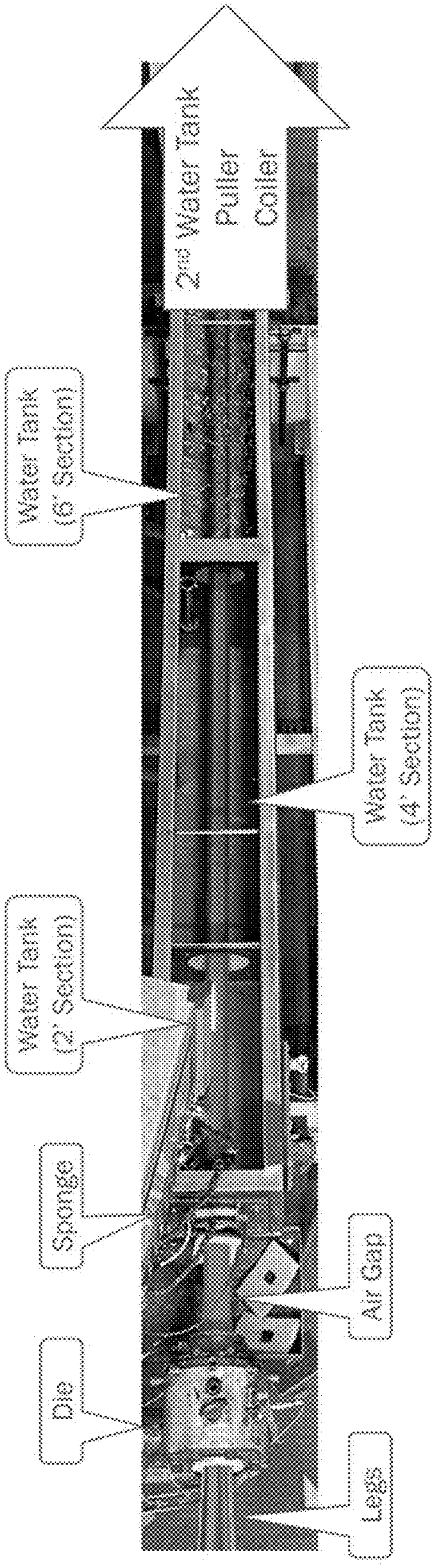
FIG. 6 is a top plan photograph of an exemplary version of the apparatus disclosed and claimed herein. The apparatus is shown bundling seven (7) microducts (i.e., "legs") inside an orange, extruded sheath. Machine direction is from left to right.

The goal of the trial was to increase the production speed without causing duct welding by controlling the shrinkage rate through varying water temperature, air gap length, and cooling method. See Table 1 below for specific conditions. The extruding equipment was set up with a pin of 3.03" OD, bushing of 3.25" ID, and 0.194 lb/ft of extruded sheath. Test specimens were 7-way 18/14 with 0.07" sheath. A photograph of the apparatus used is shown in FIG. 6.

TABLE 1

Specific conditions of water temperature, speed, and air gap for production trial of 7-way microduct bundles.

| Category | Specific Condition |
|---|---|
| Water Temperature | |
| Chilled | 58° F. |
| Hot | 125° F. (2')/100° F. (4')/80° F. (6') |
| Empty | 2' section of first tank drained |
| Empty + Air | Compressed air in 2' section |
| Speed | |
| Slow | 35 ft/min |
| Fast | 60 ft/min (Slow + 70%) |
| Air gap | |
| Short | 8" |
| Long | 18" |

Figure 8:
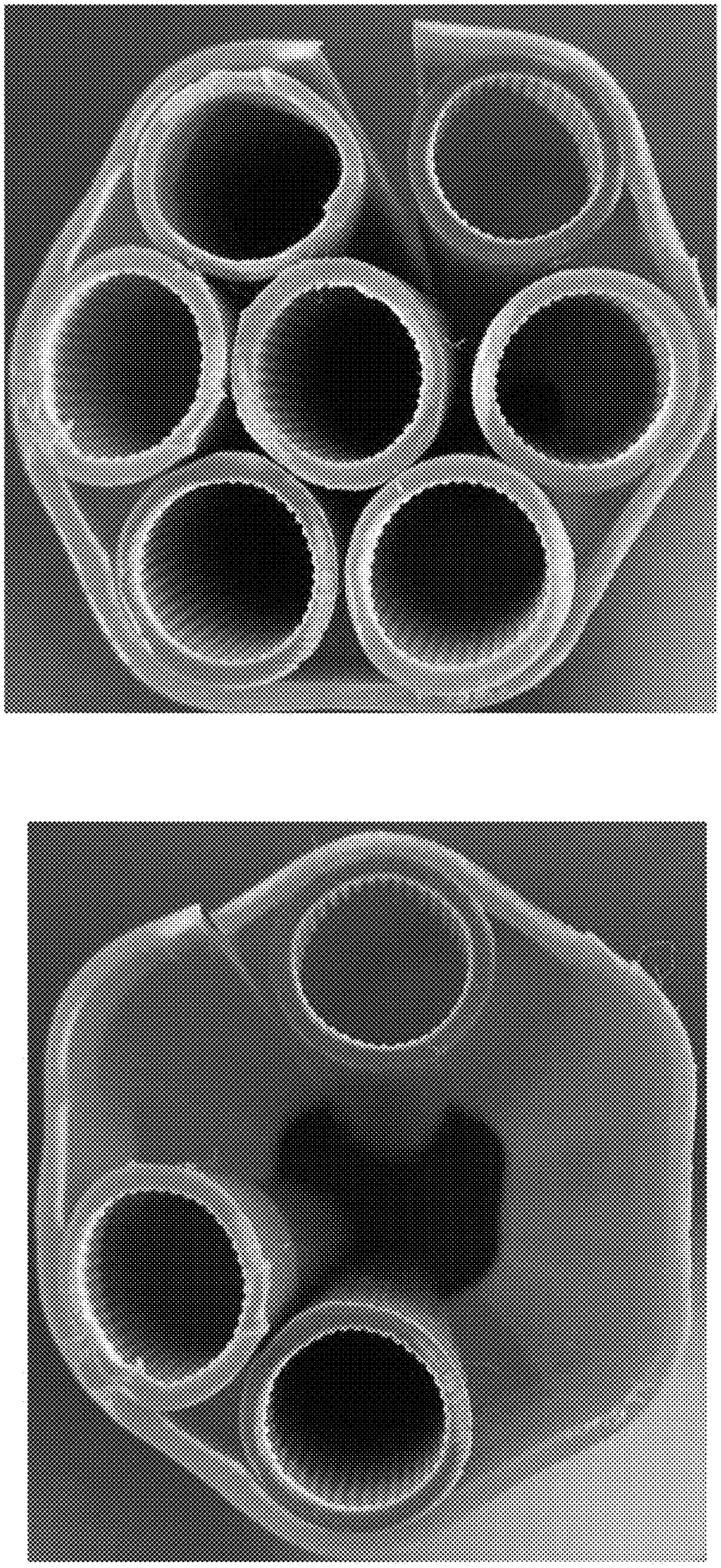
FIG. 8 shows the condition of the seven (7) microducts bundled with a sheath produced under the water temperature/speed/air gap condition of chilled/fast/short. The top panel shows all seven microducts immediately after cutting into the sheath. The bottom panel shows the three (3) microducts that were welded in place and could not be removed from the sheath.
Figure 9:
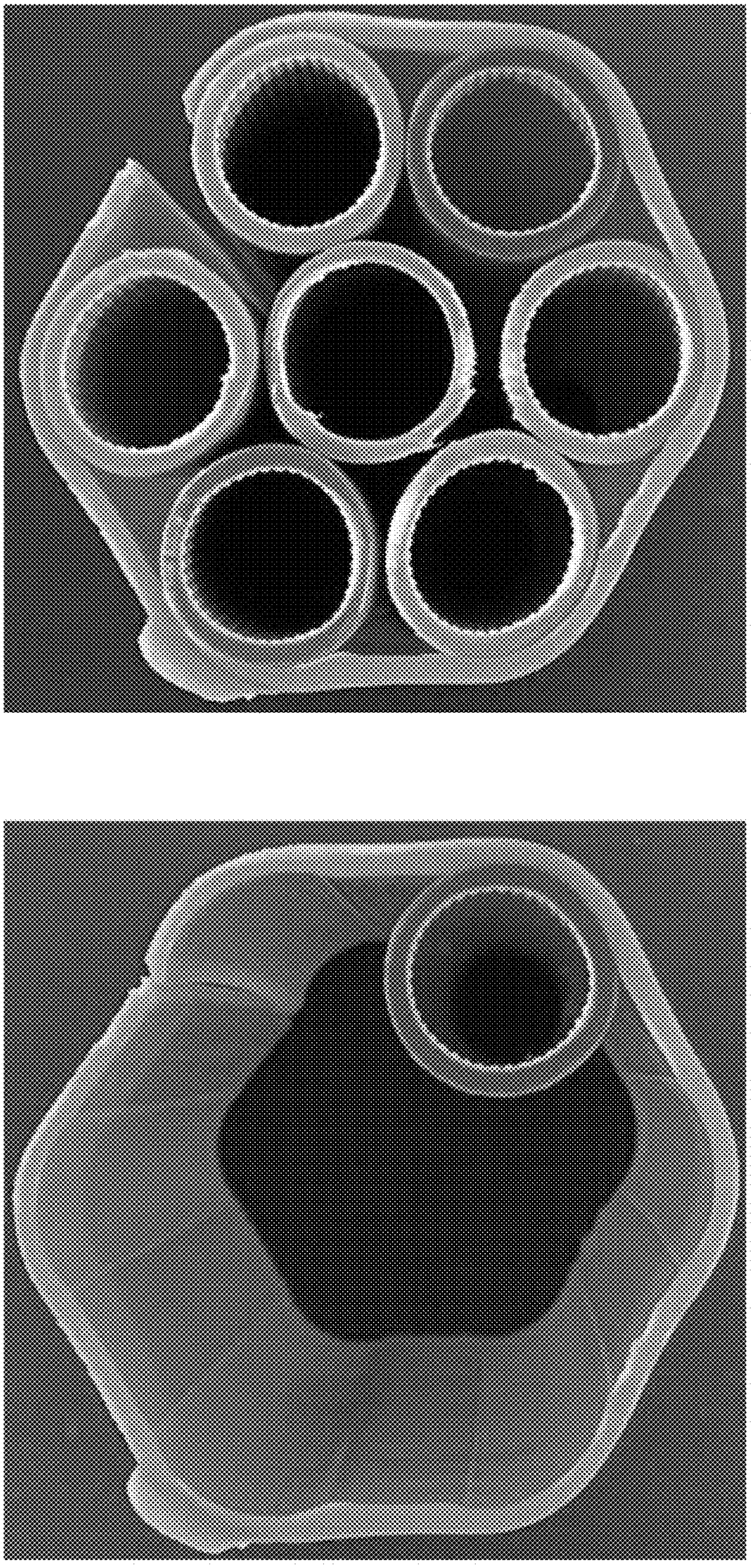
FIG. 9 shows the condition of the seven (7) microducts bundled with a sheath produced under the water temperature/speed/air gap condition of chilled/fast/long. The top panel shows all seven (7) microducts immediately after cutting into the sheath. The bottom panel shows the one (1) microduct that was welded in place and could not be removed from the sheath.

FIG. 7 shows a summary of the results. Under the water temperature/speed/air gap condition of chilled/fast/short, the ducts get sticky because the speed (60 ft/min) is higher than the standard speed (35 ft/min). See FIG. 8. When the air gap was increased from 8" (20.3 cm) to 18" (45.7 cm) (the chilled/fast/long condition) helps to relieve welding. See FIGS. 7 and 9. However, when the air gap is long, there is a higher risk of the sheath tearing at the air gap due to increased elongational stress.

Figure 10:
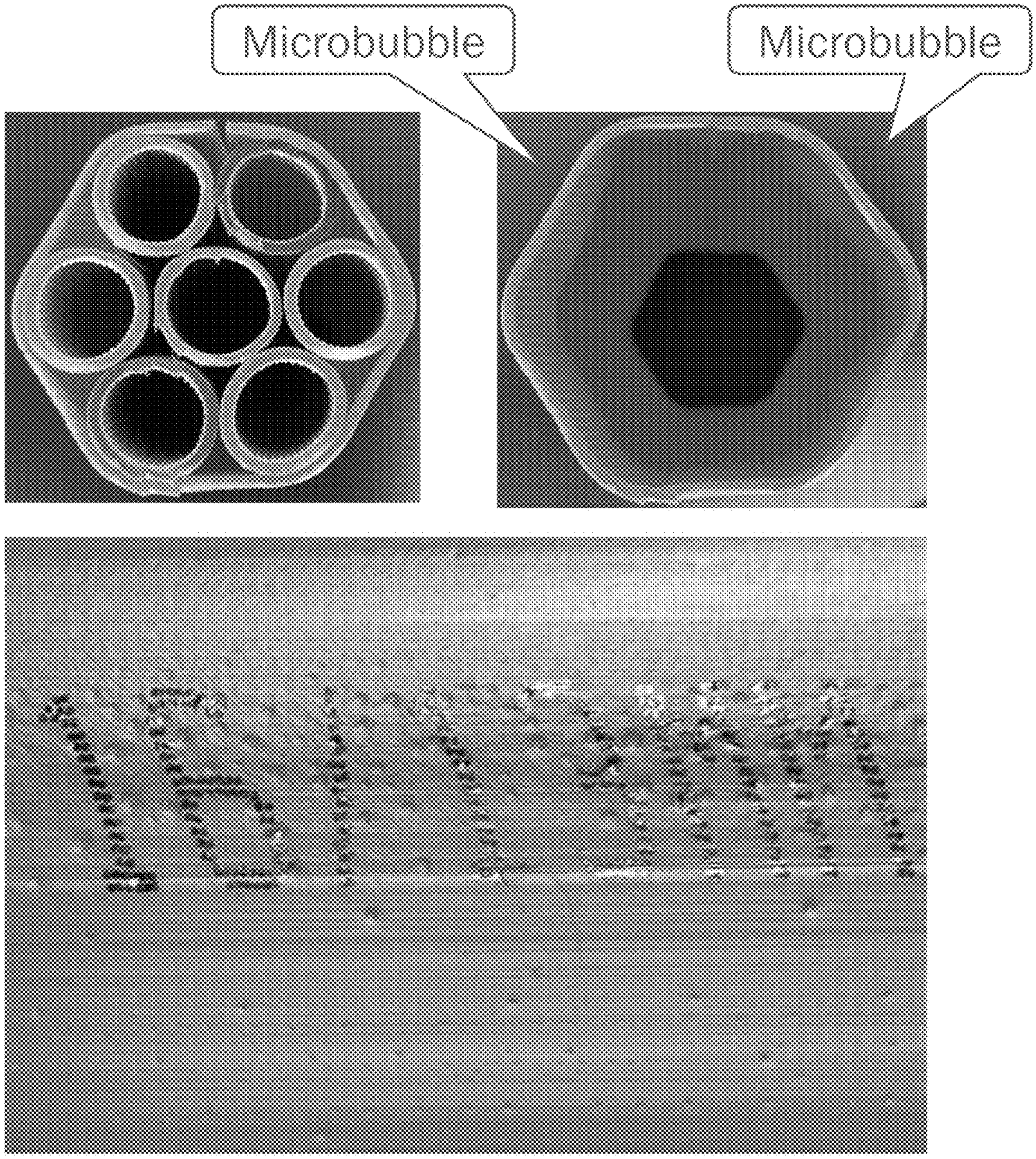
FIG. 10 shows the condition of the seven (7) microducts bundled with a sheath produced under the water temperature/speed/air gap condition of hot/slow/short. The top-left panel shows all seven (7) microducts immediately after cutting into the sheath. The top-right panel shows the sheath after the microducts were removed. The bottom panel shows microbubbles that formed on the sheath surface under these conditions.
Figure 11:
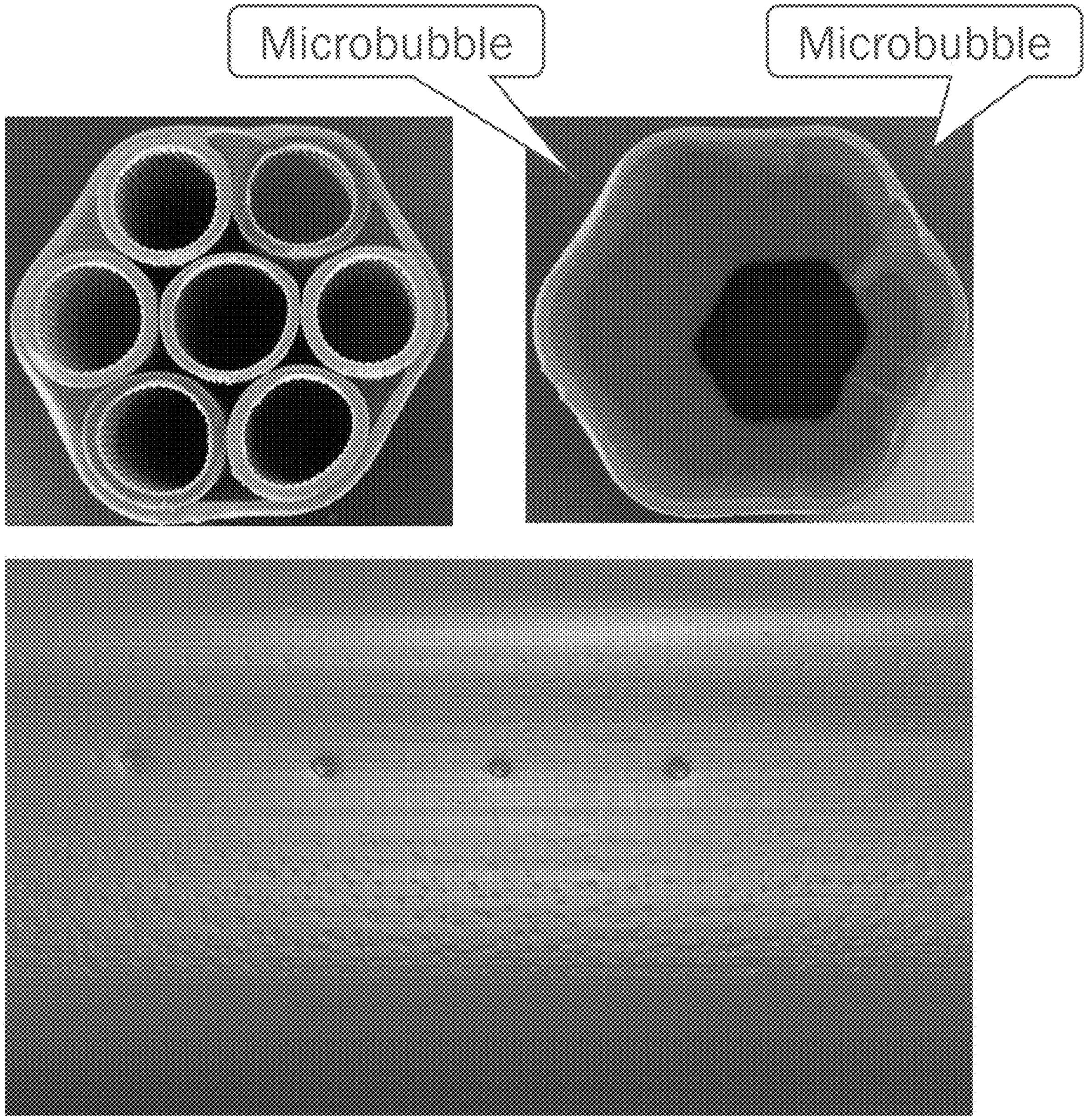
FIG. 11 shows the condition of the seven (7) microducts bundled with a sheath produced under the water temperature/speed/air gap condition of hot/fast/short. Again, the top-left panel shows all seven (7) microducts immediately after cutting into the sheath. The top-right panel shows the sheath after the microducts were removed. The bottom panel shows microbubbles that formed on the sheath surface under these conditions.

Under the condition of hot/slow/short, no visible difference was shown with sticking for the outer six ducts. The results showed the same performance as chilled water with the same air gap (the chilled/slow/short condition; FIG. 7). However, higher water temperature causes unwanted microbubbles on the sheath surface (FIG. 10). Similar results were obtained for the condition of hot/fast/short. Higher water temperature helps with sticking. Only one duct became sticky compared to three sticky and three welded with chilled water under the same speed and air gap (FIG. 7). But higher water temperature still causes unwanted microbubbles on the sheath surface. See FIG. 11.

Figure 12:
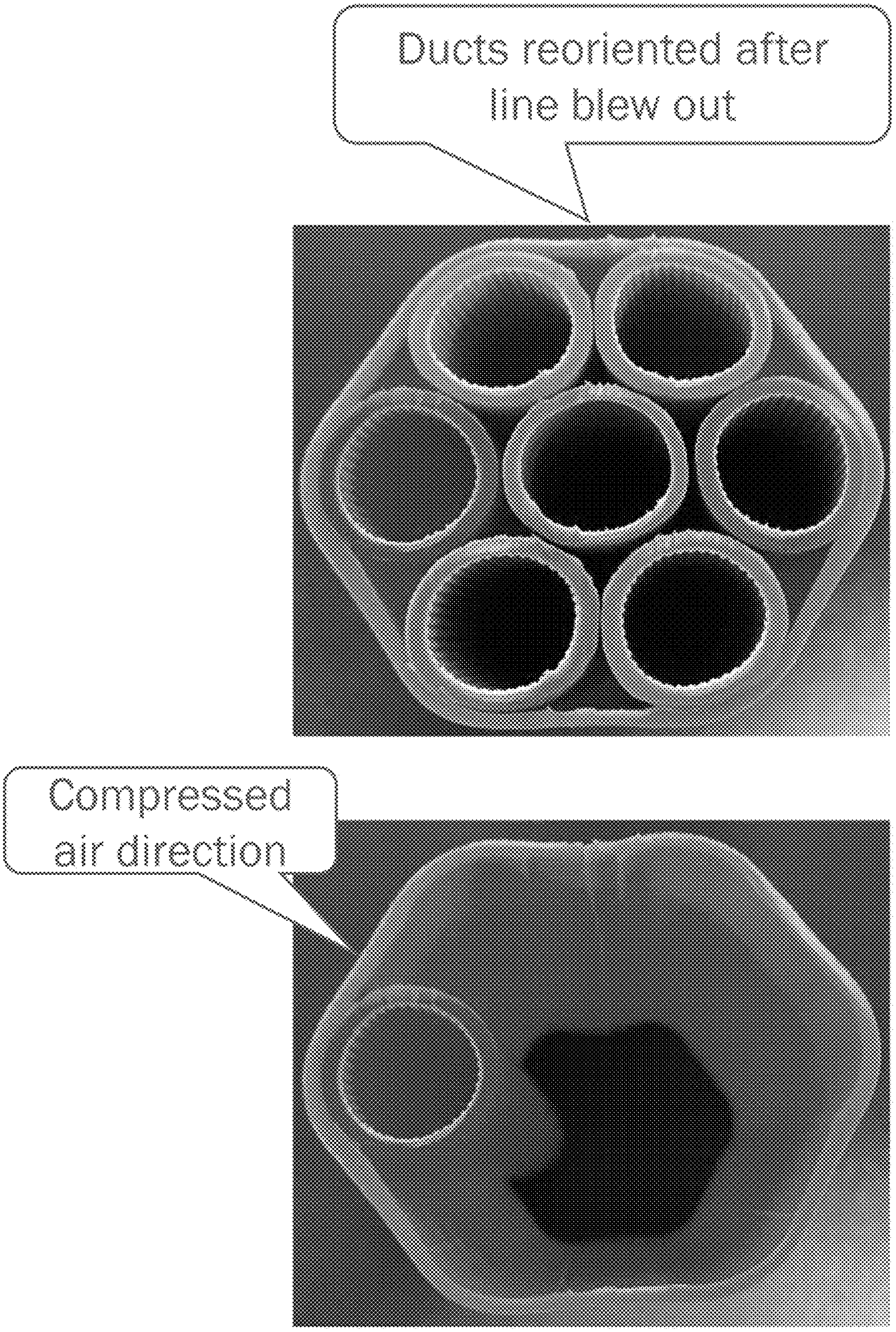
FIG. 12 shows the conditions of the seven (7) microducts bundled with a sheath produced under the water temperature/speed/air gap condition of empty+air/fast/short. The top panel shows all seven microducts immediately after cutting into the sheath. The bottom panel shows one of the microducts welded to the sheath.

Under the condition of empty+air/fast/short, although air has slower rate of cooling than water, forced air increased the cooling rate enough to start the sheath to shrink and cause welding. See FIGS. 7 and 12.

Figure 13:
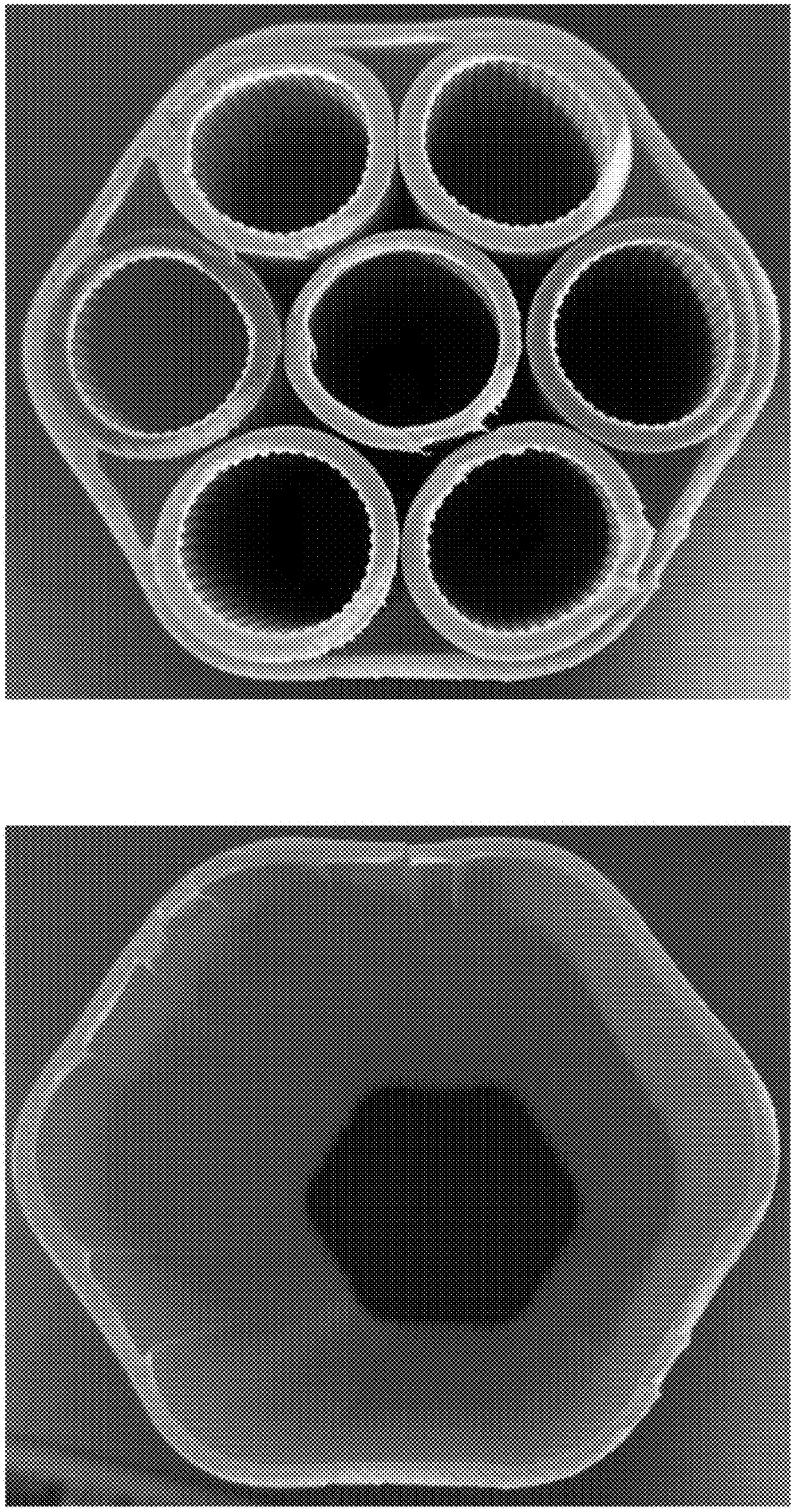
FIG. 13 shows the condition of the seven (7) microducts bundled with a sheath produced under the water temperature/speed/air gap condition of empty/fast/short. The top panel shows all seven microducts immediately after cutting into the sheath. The bottom panel shows the sheath alone after removal of the microducts.

The condition of empty/fast/short addressed the risk of sheath tearing by placing a wet sponge to the sheath after it exits the extruder and then immediately exposing sheath to the air for gradual cooling. This condition performed the best among the tested conditions with fast speed (FIGS. 7 and 13).

The condition of chilled/slow/short condition was also tested with a thin sheath. Lb/ft was decreased from 0.194 to 0.123 to test minimum sheath thickness needed to avoid tearing the extruded sheath. With a thinner sheath there is less plastic to cool, which allows more even cooling, and thus less likelihood of welding. See FIG. 14.

Figure 15A:
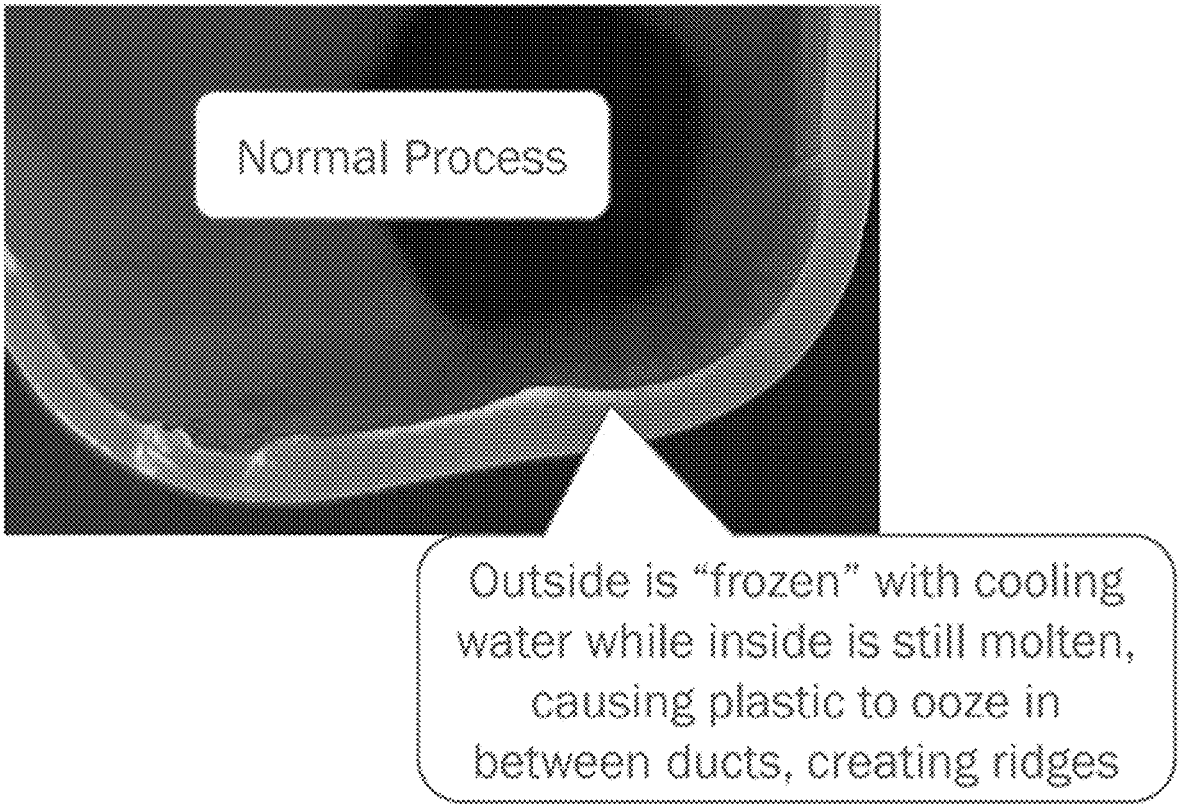
FIG. 15A shows a sheath having shrunk when its outside surface was stiff/frozen, but its inside surface was still molten. As shown in the figure, this caused portions of the molten inside surface to ooze in between the microducts.
Figure 15B:
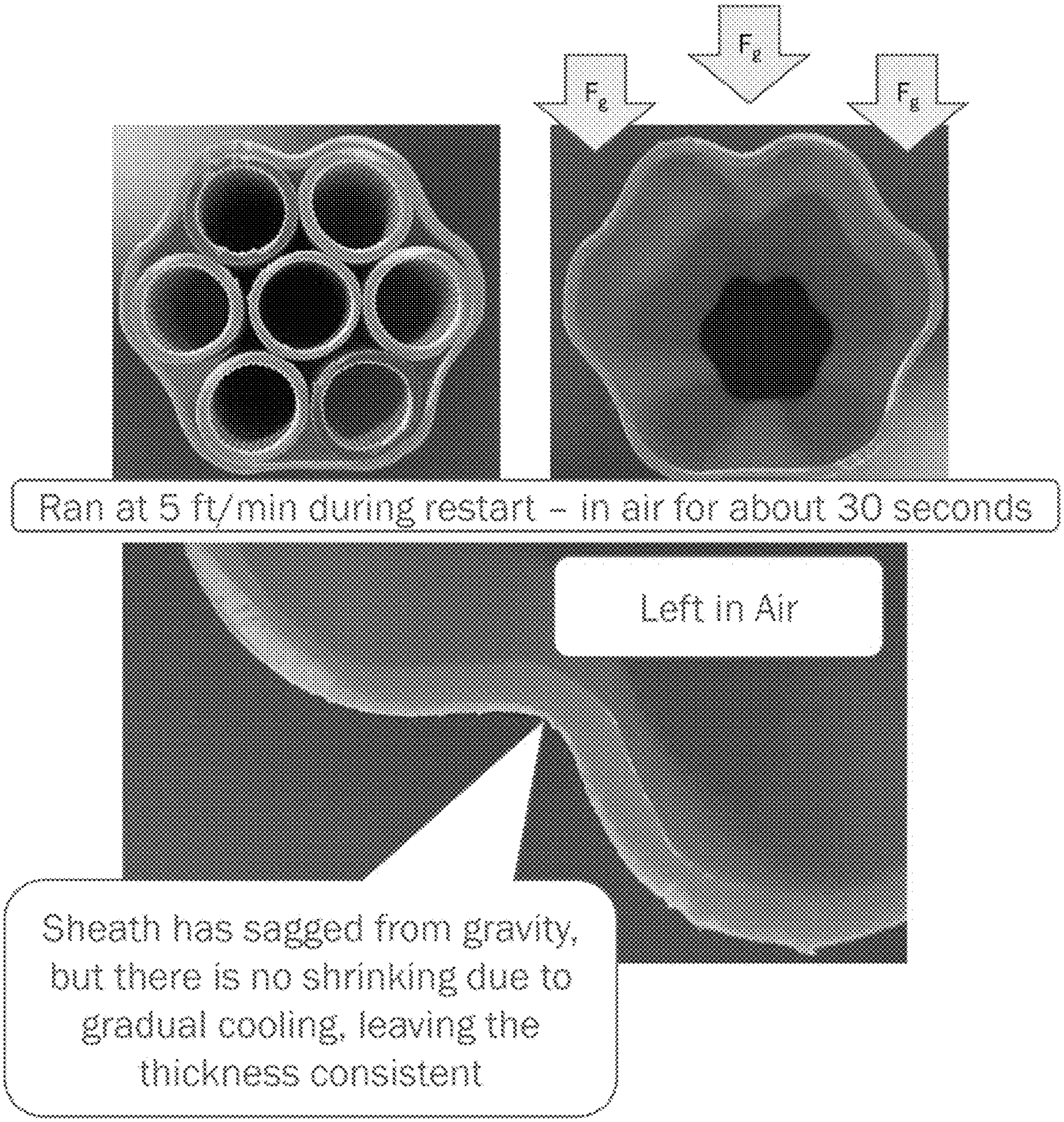
FIG. 15B shows a duct having deformed during the cooling process, but without shrinkage. The top-left panel shows how the sheath deformed about the outer surface of the microducts. The top-right panel shows how the upper surface of the sheath has sagged due to gravity. The bottom panel shows that while the sheath has sagged due to gravity, the thickness of the sheath remained consistent.

Another test was conducted to run at a speed of 5 ft/min and then air cool for about 30 seconds. But when the sheath is left in the molten stage for too long, it starts to sag onto the ducts, yielding a petal-like cross-sectional shape to the sheath (aka "Daisy Duct"). However, because the rate of cooling is gradual, there is no shrinkage of the sheath, making the thickness constant throughout. See FIGS. 15A-15B.

Sheath samples from each trial were cut in the same direction and reheated at 200° C. for 2 minutes. Sheaths produced under various water temperature/speed/air gap conditions were evaluated for machine direction thickness (MDT), transverse direction thickness (TDT), and sticky factor (SF). The results are shown in FIG. 16. Shrinkage is much greater length-wise (machine direction) than height-wise. This is because molecules are oriented in machine direction due to the extrusion pressure and thus harder to shrink. There were no detectable correlations of thickness, width, height, ratio, and machine/transverse direction shrinkage between the different processes.

In sum, the trials showed that a key factor in inhibiting welding is gradual cooling, rather than maximized cooling/agitation. Fast cooling increases the rate of shrinkage, and thus tightly welds the sheath to the ducts. By gradual cooling, production speed was successfully increased by 70% without sticking. This is highly counter-intuitive because fast cooling would seem to be conducive to faster production speeds. Using hotter cooling water somewhat helps to inhibit welding, but also induces the formation of microbubbles on the sheath surface. Forced air cooling exacerbates the welding problem as compared to un-aided cooling in ambient air. A balance must be struck, however, to avoid deformation or tearing of the extruded sheath material. Longer exposure times in ambient air inhibits welding. But excessive exposure times in air causes the sheath to deform or tear. Thus, optimization is required.

Tooling size optimization tests were conducted to minimize elongational stress. This allows the sheath to be stable in a longer air gap while still moving at a faster production speed. The use of weight of sheath per linear feet of sheath (wt/ft) to dial in sheath thickness is recommended over extruder screw speed (RPM) because it proved harder to correlate machine speed with sheath thickness.

Figure 17:
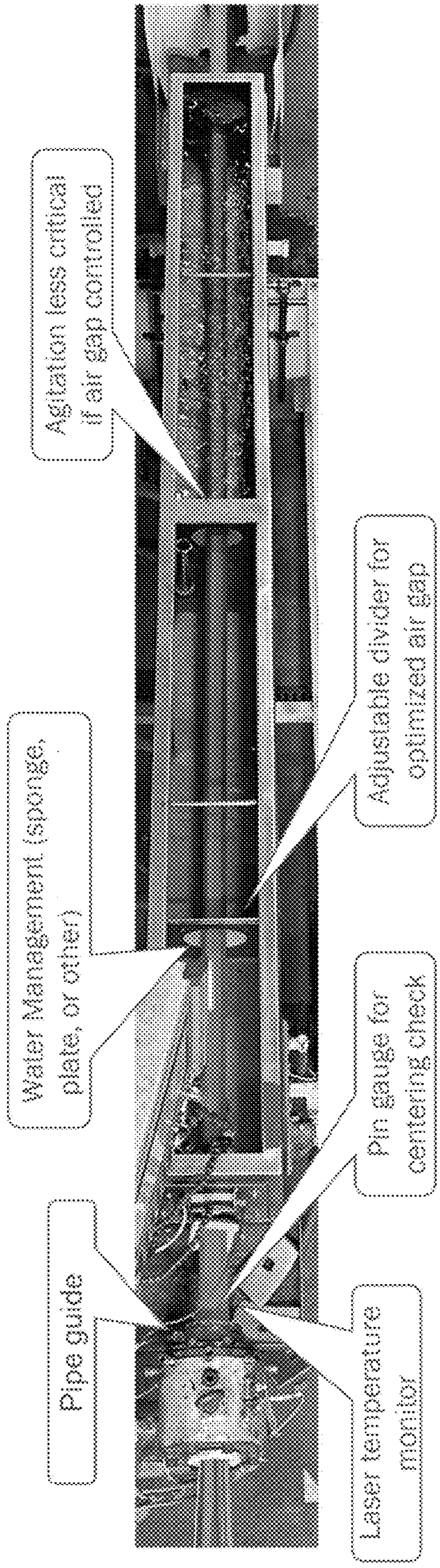
FIG. 17 is a top-plan photograph of an improved apparatus design comprising an adjustable divide for optimized air gap.

Based on the above analysis, an improved apparatus is shown in FIG. 17. The improved apparatus comprises an adjustable divider for optimizing the length of air exposure. The improved system was run with bushing size increased from 3.25" to 3.35", which resulted in larger die gap, increased draw ratio balance, increased area draw ratio, and midway speed ratio. See Table 3 below for conditions tested for the updated apparatus.

TABLE 2

Conditions tested for the updated system.

| Water | Speed | Air Gap | Pin | Bushing |
|---|---|---|---|---|
| Empty | 35 ft/min | 8" | 3.03" | 3.35" |
| Empty | 35 ft/min | 18" | 3.03" | 3.35" |
| Empty | 60 ft/min | 8" | 3.03" | 3.35" |
| Empty | 60 ft/min | 18" | 3.03" | 3.35" |
| Chilled | 35 ft/min | 18" | 3.03" | 3.35" |
| Chilled | 60 ft/min | 18" | 3.03" | 3.35" |

Example 3: Production Trial of 4-Way Microduct Bundles

Figure 18:
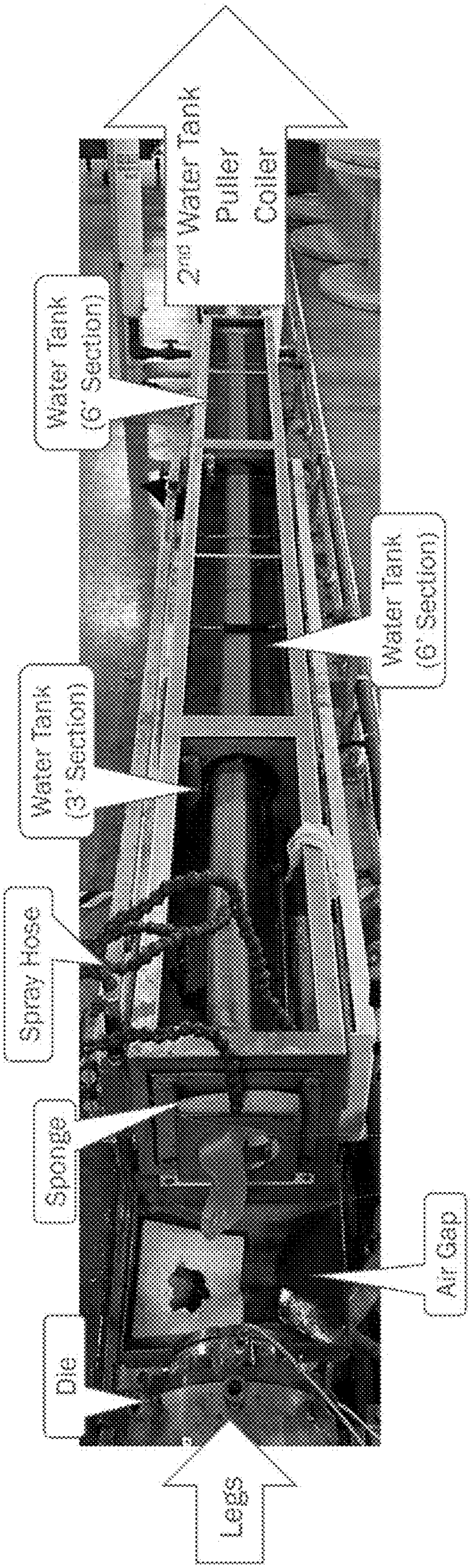
FIG. 18 is a top plan photograph of another version of the apparatus dimensioned and configured for manufacturing a four-microduct bundle.

Tests of water temperature/speed/air gap conditions were also applied to produce 4-way microducts bundled within a sheath. See Table 3 below for specific conditions. The goal of this testing was to show that the production speed could be increased by increasing the air gap and also to determine if the sheath functions in the same way when subjected to the longer air gap. The equipment setup included a pin of 4.625" OD, bushing of 5.00" ID, and 0.349 lb/ft. Test specimens are 4-way 1.25" SDR 11 with 0.07" sheath (ADDD 1619). A photograph of the apparatus is shown in FIG. 18.

TABLE 3

Specific conditions of temperature, speed, and air gap for production trial of 4-way microduct bundles.

Figure 19:
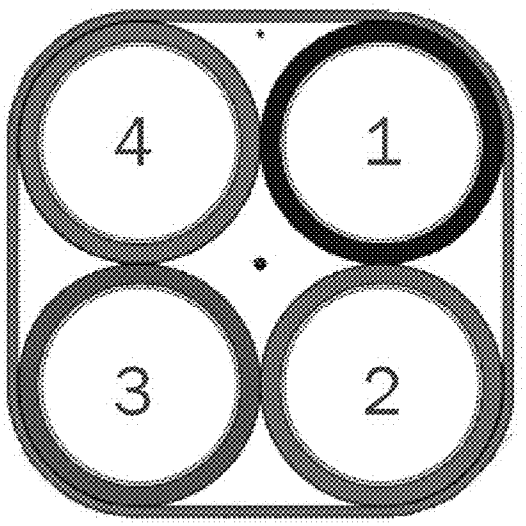
FIG. 19 is a table showing test results of the process for making 4-way microducts bundled with a sheath under various water temperature/speed/air gap conditions. Sheath thickness above each of the four ducts were measured and are shown in the table. The lower left panel shows color code of the leg conditions in terms of "slide out," "sticky," and "welded." (See description for FIG. 7.) The lower right panel shows the duct numbering.

| Category | Specific Condition |
|---|---|
| Water Temperature | |
| Chilled | 58° F. |
| Empty | Tank drained per length shown in FIG. 19 |
| Spray | 3' section drained and replaced with spray hose |
| Speed | |
| Slow | 10 ft/min (PRP standard) |
| Fast | 16 ft/min (Slow + 60%) |
| Air gap | |
| Short | 5" |
| Long | 11" |

Results of the tests are summarized in FIG. 19. Under the water temperature/speed/air gap condition of chilled/fast/short, the ducts get sticky because the speed (16 ft/min) is higher than the standard speed (10 ft/min) (FIG. 19 and FIG. 20, upper left). These findings are consistent with the well-known concept that the higher the speed, the sticker the ducts get.

Under the condition of empty/fast/long, the test showed minor improvement (FIG. 19 and FIG. 20, upper right), showing that using a longer air gap is beneficial.

Under the condition of extra empty/fast/long, sheath welding was greatly improved (FIG. 19 and FIG. 20, lower). The result was consistent with the trial of the 7-way 18/14. A longer gap may be more beneficial under these conditions (as compared to the 7-way 18/14 bundle) due to heavier wt/ft of the sheath (i.e., the product has a larger bundle diameter and thus a larger wt/ft of sheath needed to wrap the bundle) and the increased area of the sheath in direct contact with encased conduits.

Figure 21:
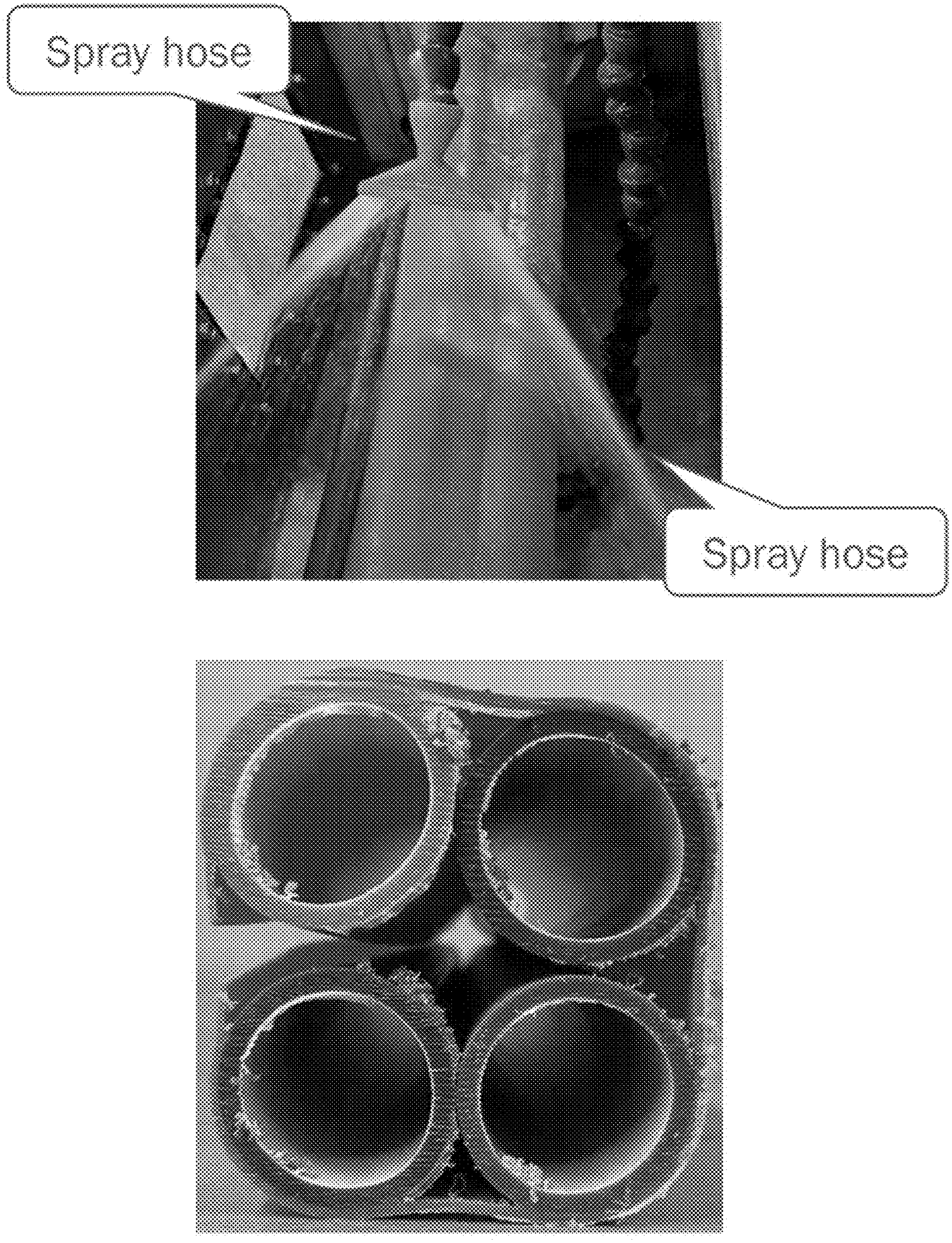
FIG. 21 shows one version of the system (upper panel) in which a spray hose is used to cool the outer surface of the sheath. The lower panel shows the final condition of a 4-way microduct bundle produced using this apparatus under the water temperature/speed/air gap condition of spray/fast/long.

Under the spray/fast/long condition, a spray hose was placed above and below the midway of the sheath in the emptied 3' section of the tank. See FIG. 21, upper. Spray cooling caused the sheath to cool too fast, causing severe welding on all ducts (FIG. 19 and FIG. 21, lower).

Figure 22:
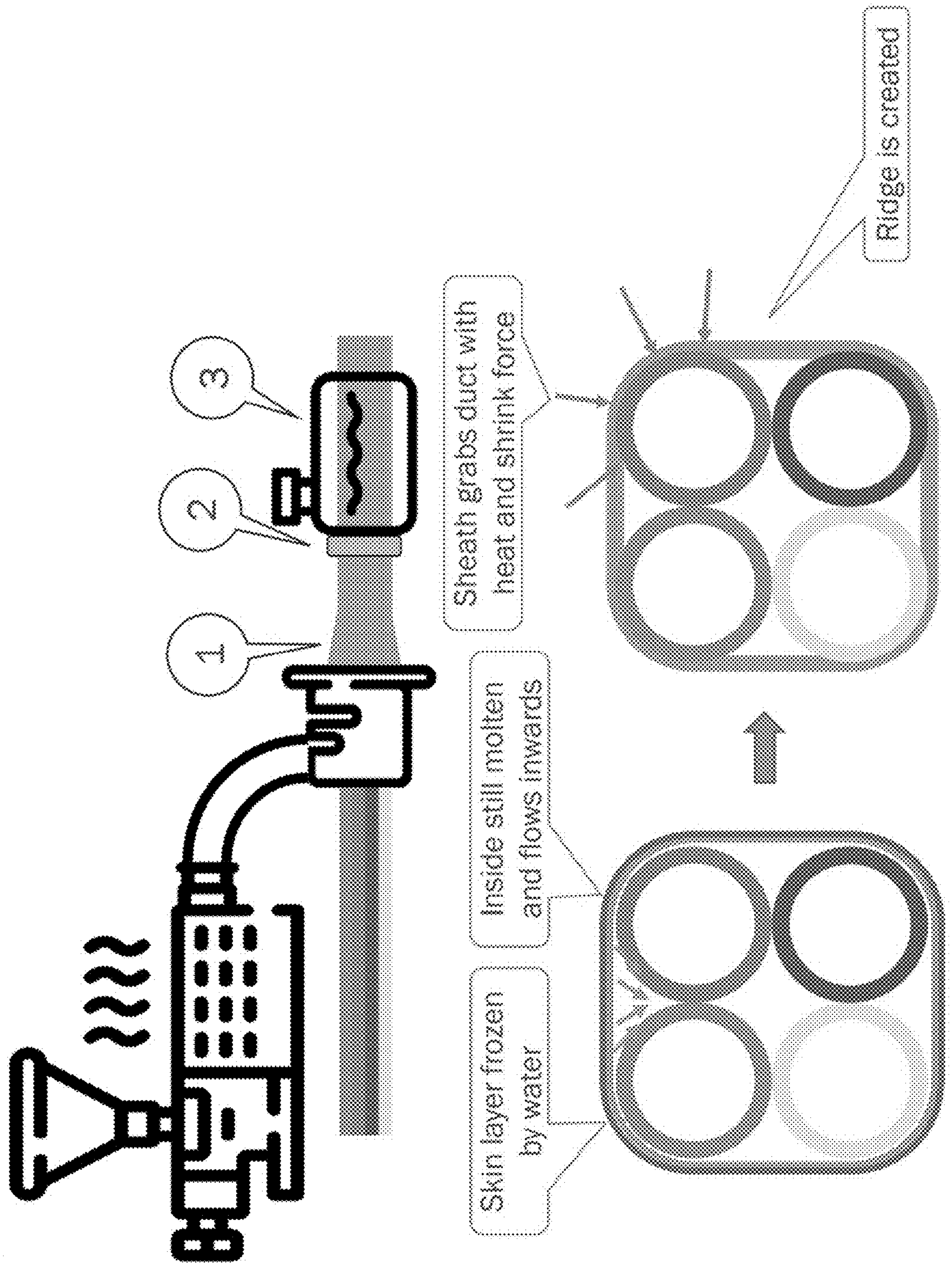
FIG. 22 is a schematic of a conventional sheath welding mechanism. 1: The speed of the molten sheath plastic exiting the die increases when it meets the ducts. The difference in speed between the sheath material and the encased microducts causes the sheath to stretch; the elongational stress causes polymer molecules in the molten sheath to align in the machine direction. Because HDPE (conventionally used as a sheath material) is a semicrystalline polymer, it shrinks more in the transverse direction (anisotropic), becoming more susceptible to bind to the microducts and cause sticking. 2: A wet sponge freezes/solidifies the outer layer of the sheath to avoid tearing. 3. While the outer layer of the sheath is solidified from the sponge, plastic on the inner surface of the sheath is still molten and shrinks inward as it cools, thereby strongly gripping the ducts and causing welding.

The production trial demonstrated the mechanism of sheath welding (FIG. 22). Together with the production trial of the 7-way 18/14, conditions that cause increased welding include:

(1) thinker sheath (0.1">0.07">0.05");

(2) higher weight per foot of the sheath (0.5 lb/ft>0.3 lb/ft>0.25 lb/ft); and (3) greater surface area contact between sheath and microducts (between the same wt/ft; 4-way 18/14=44% contact; 7-way 18/14=34% contact; see FIG. 23).

Figure 24:
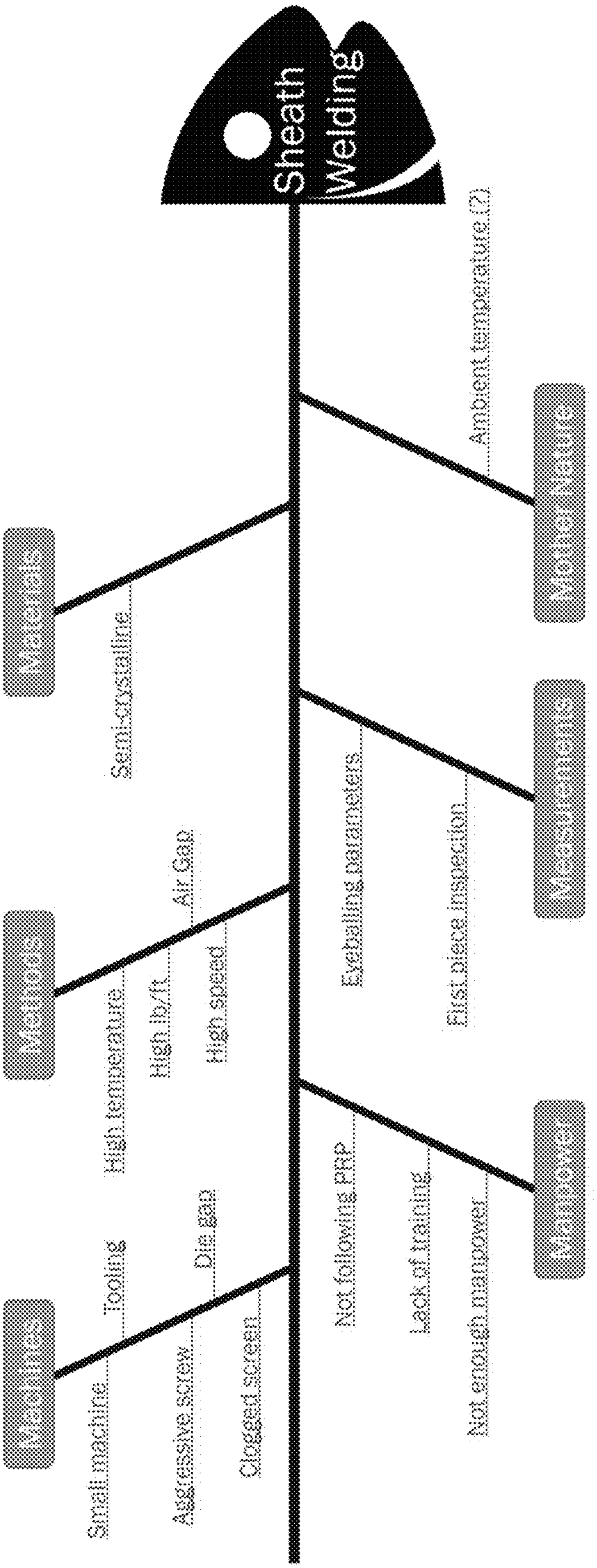
FIG. 24 is a fishbone diagram showing factors that may contribute to sheath welding.
Figure 25:
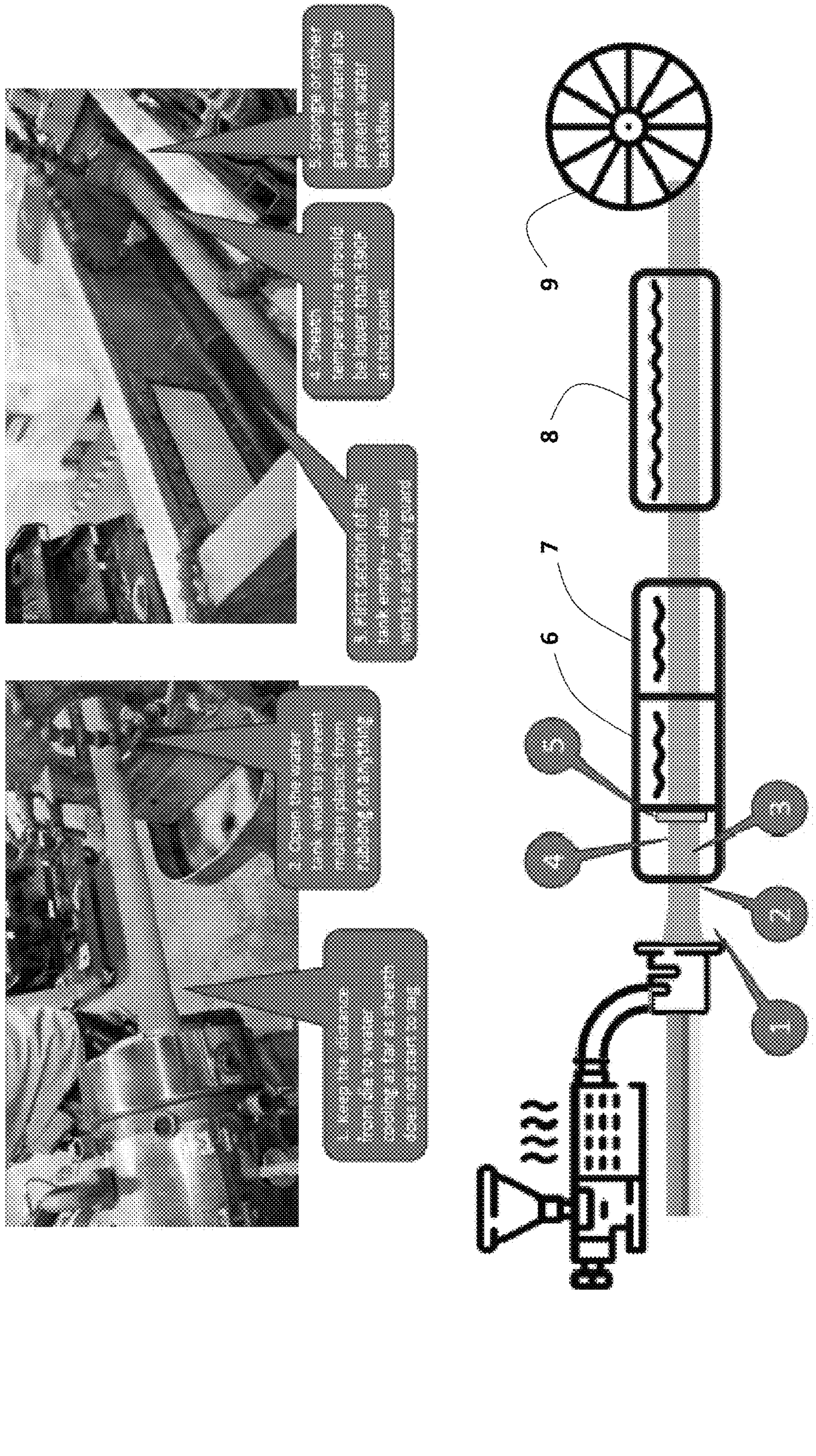
FIG. 25 is a schematic diagram illustrating how to improve the process to prevent welding.

FIG. 24 shows a fishbone diagram of factors that may contribute to stick of ducts, including factors of machines, methods, materials, manpower, measurements and ambient environment. Based on the analysis, an improvement of the process is shown in FIG. 25. The top half of the figure are photographs of an exemplary device used to practice the method. The lower panel of FIG. 25 is a schematic of the process. Both upper and lower panels of FIG. 25 have corresponding reference numerals identifying key aspects of the method. At the far left of both upper and lower panels is the extruder. The air gap is shown at 1. As noted in the top panel, it is preferred (but not required) that the air gap 1 be kept as long as possible without incurring sag in the sheath. Reference numeral 2 the inlet to the first section of the cooling tank, which contains air at ambient temperature. Reference numeral 3 shows the first section of the cooling tank. Reference numeral 4 shows the sheath-wrapped microduct after passing through the air gap and nearing the end of the first section of the cooling tank. At this point, at reference numeral 5, the microduct enters a second section of the cooling tank (and optionally additional sections of the cooling tank, designated 6, 7, and 8). A take-up reel 9 spools the finished product onto cores.

In sum, the trials confirmed that the key factor in inhibiting welding is gradual cooling in air achieved using a longer air gap. A short period of cooling in water or some other cooling medium is still required to impart the desired outer surface finish to the sheath. By using longer air gap, the production speed of the 4-way 18/14 bundle was successfully increased by 60% without any welding of the sheath to the microducts. The length of air gap needed to reduce welding depends on (a) the sheath temperature as it exits the die; (b) the wall thickness of the conduit (most easily controlled by controlling lb/ft); (c) the extrusion rate (ft/min); and (d) the area of the inner surface of the sheath in direct contact with the outer surfaces of the encased microducts. The improved process disclosed herein is robust enough to leave the annealing gap the same for all products.

What is claimed is:

1. A method of making a product comprising a plurality of microducts bundled within a sheath, the method comprising:

(a) extruding a roughly cylindrical sheath material having an inner surface around a plurality of microducts each having an outer surface in such a fashion that the inner surface of the sheath material does not contact outer surface of the microducts and no intervening structure is disposed between the inner surface of the sheath material and the outer surface of the microducts, wherein the sheath material is extruded at a temperature $T_1$;

(b) passing the sheath material and microducts through an air gap for a distance, a time, and at an air temperature $T_2$ which is lower than $T_1$, wherein no intervening structure is disposed between the inner surface of the sheath material and the outer surface of the microducts; and then (c) passing the sheath material and microducts through a cooling medium, for a distance, and time, and at a cooling medium temperature $T_3$ that is lower than $T_2$;

wherein the temperatures $T_2$ and $T_3$ are pre-selected to inhibit welding of the inner surface of the sheath material to the outer surfaces of the microducts.

2. The method of claim 1, wherein in step (b) the air gap has a length of at least about 2 feet (about 0.61 meters).

3. The method of claim 1, wherein in step (b) the air gap has a length of at least about 5 feet (about 1.52 meters).

4. The method of claim 1, wherein in step (b) the air gap has a length of at least about 9.8 feet (about 3 meters).

5. The method of claim 1, wherein in step (c) the cooling medium comprises water.

6. The method of claim 1, wherein $T_1$ is no greater than about 450° F. (about 232° C.) and $T_2$ is no greater than about 100° F. (about 38° C.).

7. The method of claim 6, wherein in step (c) the cooling medium comprises water and $T_3$ is no greater than about 70° F. (21° C.).

8. The method of claim 6, wherein in step (c) the cooling medium comprises water and $T_3$ is no greater than about 60° F. (16° C.).

* * * * *